United States Patent
Eilertsen

(10) Patent No.: US 9,652,983 B2
(45) Date of Patent: May 16, 2017

(54) TRAFFIC SURVEILLANCE AND GUIDANCE SYSTEM

(71) Applicant: Roger André Eilertsen, Askim (NO)

(72) Inventor: Roger André Eilertsen, Askim (NO)

( * ) Notice: Subject to any disclaimer, the term of this patent is extended or adjusted under 35 U.S.C. 154(b) by 0 days.

(21) Appl. No.: 14/762,564

(22) PCT Filed: Jan. 24, 2014

(86) PCT No.: PCT/EP2014/051406
§ 371 (c)(1),
(2) Date: Jul. 22, 2015

(87) PCT Pub. No.: WO2014/114751
PCT Pub. Date: Jul. 31, 2014

(65) Prior Publication Data
US 2015/0371537 A1    Dec. 24, 2015

(30) Foreign Application Priority Data

Jan. 24, 2013 (EP) .................................... 13152551
Oct. 7, 2013 (EP) .................................... 13187483

(51) Int. Cl.
G08G 1/01 (2006.01)
G01S 19/13 (2010.01)
G08G 1/16 (2006.01)

(52) U.S. Cl.
CPC ............ *G08G 1/0141* (2013.01); *G01S 19/13* (2013.01); *G08G 1/164* (2013.01)

(58) Field of Classification Search
CPC ....... G08G 1/0141; G08G 1/164; G01S 19/13
USPC ................. 701/117–119, 408; 348/149, 159; 455/456.3, 456.1; 709/204, 223, 224; 715/739, 771
See application file for complete search history.

(56) References Cited

U.S. PATENT DOCUMENTS

| 7,974,771 | B2 * | 7/2011 | Cobbold | G06Q 10/10 701/117 |
| 8,284,748 | B2 | 10/2012 | Borghei | |
| 2005/0010955 | A1 * | 1/2005 | Elia | G06F 3/0482 725/88 |
| 2009/0231432 | A1 | 9/2009 | Grigsy et al. | |

(Continued)

FOREIGN PATENT DOCUMENTS

| DE | 10 2008 009 300 A1 | 6/2009 |
| EP | 2 053 356 A1 | 4/2009 |

(Continued)

OTHER PUBLICATIONS

International Search Report issued Jun. 24, 2014 in corresponding International Application No. PCT/EP2014/051406.

*Primary Examiner* — Marthe Marc-Coleman
(74) *Attorney, Agent, or Firm* — Wenderoth, Lind & Ponack, L.L.P.

(57) ABSTRACT

A traffic surveillance and guidance system comprising a traffic server system is disclosed. The traffic server is configured to receive and update and record data of geographical positions of registered road users, and wherein each registered road user is registering a replaceable and modifiable geometrically shaped model of a field of view representing the respective road users observation space and observation ability of possible traffic incidents around geographical positions the respective road users are located on at any time.

22 Claims, 9 Drawing Sheets

(56) References Cited

U.S. PATENT DOCUMENTS

2011/0128902 A1  6/2011 Guo
2011/0246594 A1  10/2011 Cobbold

FOREIGN PATENT DOCUMENTS

EP    1 938 296 B1    9/2011
WO    2008/034264    3/2008

* cited by examiner

TRAFFIC SURVEILLANCE AND GUIDANCE SYSTEM

FIELD OF THE INVENTION

The present invention is generally related to traffic surveillance and guidance systems collecting and providing traffic information and advice to registered road users like commuters, people driving their cars and/or people utilizing public transports etc., wherein the system communicates with road users via mobile terminals such as mobile phones, Global Positioning System (GPS) navigation terminals in cars etc., and especially to a traffic surveillance and guidance system providing a virtual extension of field of view of the traffic situation around respective registered road users.

BACKGROUND OF THE INVENTION

Monitoring of traffic conditions in and around cities is a task that often is performed by helicopters hovering above the road systems, and wherein a radio reporter in the helicopter broadcasts directly on a special radio channel to everyone that is listening to the channel, for example when driving in their car. In this manner it is possible to provide communication of updated traffic conditions from one source to a plurality of road users simultaneously. The road users can take this information into account when they are driving. It is also possible to update Internet pages with the same kind of information online by operators that is also listening for example to the radio reporter, and which also can make calls to public traffic control centres, the police, private car organizations, or any other type of institution that can provide relevant traffic information and/or additional information, and incorporate this information for example on published Internet pages. Such Internet pages can be read via mobile terminals over a wireless network.

Mobile GPS (Global Positioning System) navigation terminals for use in cars may also be equipped with traffic information systems. These systems are usually based on a server system collecting information about the traffic situation, for example from public traffic surveillance organisations, the police, road maintenance companies etc. Special traffic situations like an accident can be recorded by road users reporting the situation to operators of the server system, and when another road user using the specific GPS navigation tool is identified as being in the proximity of the road accident, the server system will provide information to specific road users in the area via the GPS navigation terminal located in the car of the road users. For example, the navigation map may be updated by the server with symbols representing an accident, or a blocking of the road because of road work or similar symbols representing other reasons for the traffic problem etc.

The European patent application EP 2053356 A1 discloses a navigation system capable of outputting situation information of a specified area according to real-time traffic information including traffic regulation. A navigation apparatus (200) can make a user recognize the moment when a vehicle (Q) enters a specified area (A) where a situation which affects the travel of the vehicle (Q) along a navigation route (r) is generated and the situation (inf(A)) indicating the situation by using an icon (x) indicating an entry position (pin) and having a design decided according to the situation information (inf(A)). The navigation apparatus (200) can provide advice to the user to perform an appropriate countermeasure in accordance with the situation such as re-search of the navigation route (r) or detour from the navigation route (r).

The European patent EP 1938296 B1 discloses techniques for assessing traffic conditions in various ways based on obtained traffic-related data, such as data samples from vehicles and other mobile data sources traveling on the roads, as well as in some situations data from one or more other sources (such as physical sensors near to or embedded in the roads). The assessment of traffic conditions based on obtained data samples may include various filtering and/or conditioning of the data samples, and various inferences and probabilistic determinations of traffic-related characteristics of interest from the data samples. In some situations, the inferences include repeatedly determining traffic flow characteristics for road segments of interest during time periods of interest, such as to determine average traffic speed, traffic volume and/or occupancy, and include weighting various data samples in various ways (e.g., based on a latency of the data samples and/or a source of the data samples).

The U.S. Pat. No. 8,284,748 B2 by Hooman Borghei discloses a method and system for formation and tracking of a location-sharing group. The location-sharing group can be performed ad hoc without the assistance of a central server. A geofence can be defined that encloses the current locations of the participating devices in the location-sharing group. The geographic location of the location-sharing group as a whole can be tracked and provided to the participating devices in the location-sharing group. Group-level location-sharing can be enabled. Departure of a participating device from the location-sharing group can be detected based on the current location and the coverage radius of each device in the location-sharing group. Entry of points of interest into the geofence of the location-sharing group can be detected and notified to the participating devices in the location-sharing group.

The European patent application EP 20070039 A1 (WO2008034264A1) disclose a commuter groups service (CGS) that allows commuters to join commuter groups so that they are able to socialize while commuting. Through the commuter groups, the users may share commuting routes, traffic updates, road conditions, and other information. Group members may arrange car pools, short term riding arrangements, and may anonymously or directly contact each other. The CGS may collect group member position information, e.g. GPS information, to enable the CGS to calculate traffic conditions and to select location specific information for group member users. The system may include an on-line service accessible through a computer or wireless networking device. The user may log into the CGS, create or modify a user profile, and join groups of their choosing. Groups may be associated with specific events or with getting to/from work. Commuter groups may be formed for commuters that use private vehicles and/or public transportation.

US 2009231432 by Grigsy Travis et. al discloses a vehicle to vehicle network configured to submit video streams from video cameras in the respective vehicles to the other participants over the network. According to the teaching the system identifies which video stream most participants are watching, and then this video stream is submitted to all participants.

Despite the fact that there is a plurality of respective prior art solutions with respect to traffic surveillance and guidance systems there are still some aspects of road conditions and road user behaviour that would be beneficial to incorporate into a traffic surveillance and guidance system.

It is evident that systems as described above rely heavily on the data quality of the data being collected. Accurate road or traffic information that is up to date is the key to a successful use of such systems. Even though it is known from for example EP 1938296 B1 that there might be sensors embedded in the roads collecting traffic information, it is not common to have such sensors everywhere. The system is also dependent on that people do report situations, and that there are systems and operators available that can convert such information into traffic server based information, for example tagging information with GPS coordinates and format the information into a correct computer readable format, and for example update navigation maps in cars with symbols representing respective types of incidents.

It is also common that traffic surveillance is limited to the main roads which carry the main load of the traffic. Side roads etc. may also have traffic problems and are usually discovered by a road user being the first person to encounter a situation, for example an accident, a blocked road due to a house on fire etc.

These situations can be reported by the driver, for example via a mobile phone call to a central traffic surveillance centre, but usually it takes some time and effort to report such events. Therefore, there is usually a threshold in behaviour for doing traffic updates by road users and/or operators updating for example a database. Operators of databases will make a priority of the main roads, and delay operations related to side roads. If an accident happens drivers are occupied with their own safety and avoiding being trapped in a situation before they might think of calling and reporting a situation to a traffic surveillance system operator.

It is also a known problem that not only one driver reports for example a road accident. If several road users makes mobile phone calls to a central traffic surveillance centre, several operators will deal with the same situation and other important events may be blocked from being reported since a caller may not get through to an operator within a reasonable timespan, and the caller aborts the call.

The benefits of having a central located institution or server system or similar arrangement receiving traffic information from a plurality of sources, and which can make analysis of traffic situations, and can report situations and advices to road users are obvious. However, the information usually covers a whole region like a city and is usually meant to provide a general assessment of the flow of the traffic in the city, which part of the city has good road conditions and which part of the city where there might be queue problems etc. In between news of general road conditions news flash of accidents, fires, and similar incidents that may influence road conditions in specific areas may be reported to everyone. Instant information and an advice to a road user of an incident that happens in the neighbourhood of his present position on a road may not reach him in time. It is a known fact that the ability to avoid being trapped on the road due to an accident is a matter of time. If the information or warning or an advice for an alternative route comes too late the road user will probably be trapped. Then the warning and advice bear no significance to the road user, and can instead sometimes be experienced in a negative manner.

Another typical feature of prior art traffic surveillance systems is that road users have to find the information that is relevant for their current position. Even those prior art systems that can provide a direct message, or is providing an update of navigation maps with respective symbols as mentioned above, requires an intervention by a road user. For example, a text message about an incident sent by a server system to a navigation terminal requires that the road users receiving the message makes an assessment that the message actually do have impact on their own traffic situation. There will be a geographical limit to the relevance of a specific message, and also the road users intended and continued travel after the specific message was received has impact on the relevance of the message. For example, if the road user has in mind to turn off the road he is travelling on, or is parking his car at a road café the message may not have relevance for him anymore. When resting at the road café it would also seem unnecessary to continue to inform the road user about the traffic situation since he is not moving in the traffic. It only happens that he is at a geographical location that is identified as relevant for road users as such in the area with respect to certain traffic conditions. If the road user is a road user of a commuter type of service, other road users of the commuter group would probably continue to travel ahead away from his position at the road café. Then he cannot provide any relevant information to the other road users of the commuter group and the other road users would probably be so far away that they do not have any relevant information for him either. It is when he again starts to travel that he would need information from other road users that are in a reasonable distance from him. That would require a new membership in another commuter group located in his area of travel.

Updates of navigation maps with symbols do have some of the same issues with respect to relevance for a road user. One problem is related to zooming of maps. If the road user has zoomed into an area to be able to spot details of a road system the updated symbols may be located outside the zoomed area. If the update is accompanied with a text message that an update has occurred the road user needs to zoom out before spotting one of maybe several symbols. Then there is a task for the road user to evaluate which symbol and what kind of impact the type of traffic incident that has been reported via the present symbols on the navigation map has for his continued travel, for example which symbol is the latest updated symbol.

The navigation system will probably know the intended destination for the travel since this is the normal purpose of using a navigation terminal in the first place. However, the system knows only the intended destination and a proposed route to follow to reach the intended destination. The system does not know the behaviour of the road user. It is known that a navigation system identifies a situation when a road user departs from a proposed route. However, this can be the intention of the road user, for example he can depart the proposed route to visit a friend or family, or he remember a good restaurant at lunch time located in a village some distance away from the road he is travelling on etc. Therefore it is a challenge for a traffic surveillance system and guidance system to account for planned or unplanned changing user behaviour.

It is a beneficial feature of a traffic surveillance and guidance system to be able to filter information that is sent to specific road users. First of all to make sure that the information is relevant. Secondly, it is important to reduce the flow of information, i.e. remove information and advices of no significance to a specific road user. A road user driving a car is in a volatile situation where car accidents easily can happen if the driver loses his attention just for a second. Therefore, it is beneficial that a road user do not experience what is denoted as information overload.

A main challenges for road users driving a car for example, is to be able to view and assess road conditions in the vicinity of the current position of the car on the road, for example 500 meters ahead, or a kilometer ahead. However, houses along a road, hilltops, trees, huge trucks etc. may obscure the visibility and observation capacity the road user do have if the view around him was free of any obstacles. Usually it is of no interest to know road conditions the driver will encounter after driving an hour, or if the driver plans to exit the road he is driving on due to change of plans for example. As illustrated with the prior art examples above of a central located server system, the server may not be of help for an individual specific road user all the time. However, there are of course other types of information that can be of interest, for example information related to a selected destination for a trip. What is important is that the relevance of the information is also related to current behaviour of the road user. When the road user turns off a main road he should not need to receive information that apparently is outside the scope of his interest (i.e. the rest of the main road he was driving on). This kind of non-relevant information may distract a driver, and can in some instances provide the information overload condition referenced above (stress) where the driver no longer can react rationally on relevant information. If a road user is interested in traffic information in general, the road user can anyhow search for example a relevant Internet page before he starts to drive, or when being parked at the side of the road.

Even though another driver can report a situation not visible for other nearby road users to a central traffic surveillance system, the feedback to users from the central traffic surveillance system might take too long to be delivered quick enough for example due to other activity in the traffic surveillance system, due to priority of certain main roads for example, or because of an accident that happened 2 km ahead on a prioritized main road as mentioned above. In the meantime a road user that was blocked from viewing the nearby incident can arrive to the scene and might be trapped on the road for a long time. Then it is of no use if a central traffic surveillance system reports the incident after a while.

In prior art it is known that a server system may keep track of geographical positions of for example cars driving on roads. Therefore, it is possible that a server system can identify an upcoming queue problem on a specific road and can inform road users for example by sending out messages to cars associated with the respective tracked geographical positions. However, the association of a geographical position must then be with a mobile device registered to a specific user. In this manner the server system keeps track of identified persons all the time. In view of privacy and the general need of protecting people from unauthorized use of such registered data there is still a need for a different solution.

Therefore, there is a challenge with respect to traffic surveillance systems to be able to collect traffic relevant information quickly enough and then to be able to make the information available to road users that are in need of the information.

According to an aspect of the present invention, a traffic surveillance and guidance system may take into account observations made by respective road users and convey such information directly to other road users being located in a reasonable distance away from the road user that reports an incident, and vice versa. Therefore, within a certain geographically sized area road users should be able to provide relevant traffic information to each other directly. However, the challenge is to find who is within this certain geographical area and to know if they are willing to report information to other road users and still be able to maintain for example their privacy. They must also be willing to receive information. What then about road users being located close to the boundaries of the specific geographical area? Or is moving in or out of the specific geographical area? A road user being located just outside the boundaries of the geographical area may also need information that is deemed to be relevant for road users within the specific geographical area. In a broad sense the problem is related to locate random road users randomly located relative to each other within a random time spam to share for example their relevant fields of views and observation capability with each other and the traffic server during the random time span.

In addition to providing traffic information, guidance and specific advices to registered road users of a system according to the present invention, the inventor has also realised that modern roads and public transport infrastructures also comprises different services and tasks. Petrol stations or electric charging stations etc. are well known service providers. In addition restaurants and cafés are usually present along roads in addition to toll stations on toll roads etc. According to an aspect of the present invention, such services, functions and actions can be made accessible for road users by letting such providers etc. are registered as road users in an example of embodiment of the present invention. Non-limiting examples of services and/or functions etc. assigned to a union can be payment transactions, video distribution, time tables of public transport systems, information about delays of trains, air planes etc.

Therefore, there is a need of an improved traffic server system providing ease of reporting situations on roads and other transport means and systems, and which quickly can inform all relevant road users and other people moving in the traffic as quickly as possible about any incidents that have relevance for their present on-going journey. Further, any advice should be sent only to road users that are in need of the specific advices. However, it is necessary to distinguish between message content and actions, services, functions etc. which a server system should provide to a road user dependent on different needs of a specific road user. Therefore, differentiation of message content and advices and services and/or functions is a beneficial feature of a traffic surveillance and guidance system.

Hence, an improved traffic server system would be advantageous, and in particular a more efficient and/or reliable traffic server system would be advantageous.

OBJECT OF THE INVENTION

It is a further object of the present invention to provide an alternative to the prior art.

In particular, it may be seen as an object of the present invention to provide a traffic surveillance and guidance system providing communication with road users that solves the above mentioned problems of the prior art by providing tools for generating and controlling unions with communication capabilities of respective observation space and observation ability of respective road users being in geographical positions providing a partly overlapping of each respective road user's observation spaces.

In particular, it may also be seen as an object of the present invention to provide unions between participants wherein specific actions, services and/or functions or messages are only enabled when there is a union.

SUMMARY OF THE INVENTION

Thus, the above described object and several other objects are intended to be obtained in a first aspect of the invention by providing a traffic surveillance and guidance systems based on a concept of a dynamic and/or temporary establishment of a union of fields of views of respective road users ((road user 1) U (road user 2) U . . . (road user i)), thereby observation spaces are combined, and observation abilities are joined. Therefore, a union may provide sharing of the observation space and observation ability of each respective road user in such a manner that each respective road user achieves a field of view outside the physical boundaries of his field of view.

According to a further aspect of a traffic surveillance and guidance system according to the present invention, when a union between respective road users are established, a message distribution process is established by the system between road users that are in the union, and between the system and road users in the union.

According to a further aspect of the present invention a message distribution process established in a union by the system may further comprise specific defined actions, services and/or functions within the union.

According to a further aspect of the present invention, enablement of specific actions, services and/or functions within a union may be enabled by qualifying a field definition related to the respective services and actions, and whenever a union between qualified fields are established the corresponding actions, services and/or functions are made available within the union by the server.

According to a further aspect of the present invention a traffic server may be configured to be a traffic server among a plurality of traffic servers, wherein each respective traffic server is configured to support road users in a specific defined geographical area, and wherein the plurality of traffic servers further is configured to exchange data related to a road user when the road user is entering a specific geographical area served by another traffic server.

According to a further aspect of the present invention, a traffic surveillance and guidance system may be integrated with a social network.

The invention is particularly, but not exclusively, advantageous for obtaining a union with message handling, actions, services and/or function capabilities that is created automatically without any user interference between road users when their respective field of views or qualified fields starts to be partly overlapping, and the union and the corresponding information sharing capability and actions, services and/or functions in the union lasts as long as there is at least a partly overlapping between at the least two respective fields of views.

The invention is particularly, but not exclusively, advantageous for obtaining a traffic surveillance and guidance system comprising a traffic server system configured to provide acquisition of traffic information from a plurality of information providers and a plurality of registered road users of the traffic server system, and further being configured to provide traffic information, guidance and traffic advices to registered users of the traffic server, wherein the traffic server is configured to receive and update and record data of geographical positions from mobile terminals associated with registered road users, and wherein each registered road user is registering in the traffic server system a replaceable and modifiable geometrically shaped model of a field of view representing the respective road users observation space and observation ability of traffic conditions and incidents around geographical positions the respective road users are located on at any time, the traffic server is configured to follow movements of road users based on the received and recorded geographical positions, and whenever the traffic server detects that relative movements between road users is providing a situation wherein the modelled field of views of at least two road users are partly overlapping, the traffic server is configured to establish a union between the at least two field of views, wherein the union is configured to provide at least a message distribution process between the at least two road users enabling distributions of messages related to traffic conditions and incidents observed by the at least two road users in the union, the traffic server is further configured to cancel the at least provided message distribution process to or from a specific road user if the relative movement of the specific road user with respect to the union is providing a situation where there is no longer a partly overlapping of the specific road user's modelled field of view with any other modelled field of views of other road users in the union.

The invention is particularly, but not exclusively, advantageous for obtaining a server system providing actions, services and/or functions for road users having modelled fields that are qualified with specific qualifiers linked to respective actions, services and/or functions, and whenever a union of qualified fields are detected by the server system, the server system is configured to provide the necessary computer and networking infrastructure and further executing computer programs facilitating the respective actions, services and/or functions assigned to the specific union.

The invention is particularly, but not exclusively, advantageous for obtaining a system providing push messages to road users located in a geographical area around a reported incident, or an event affecting road conditions etc., wherein the traffic server is configured to identify messages related to incidents or events affecting road conditions, wherein the traffic server creates a field of interest around the geographical position of the reported incident or event, wherein any road user being in a union with this field of interest, or is coming in a union with this field of interest, receives push messages and advice regarding the incident or road condition.

According to an example of embodiment of the present invention the traffic server is configured to record messages sent in a union between at least two road users, and further is configured to provide an arbitration process between conflicting content of messages within a union, wherein an outcome of the arbitration process is to select one of the conflicting messages to be the one to be distributed in the union, or to cancel the distribution of a specific message in the union, or to select another message for distribution in the union.

According to an example of embodiment of the present invention each respective traffic server serving respective geographical areas is configured to be a road user in itself, wherein the modelled field of view of the respective traffic servers are the respective geographical areas served by the respective traffic servers.

According to an example of embodiment of the present invention the geographical area served by a respective traffic server is optionally segmented into a plurality of modelled field of views.

According to an example of embodiment of the present invention a geographical area served by a respective traffic server is provided for as a computer modelled topological model of the geographical area.

According to an example of embodiment of the present invention the traffic server is by default in respective unions with respective road users, thereby the system is providing a plurality of independent default unions wherein each respective default union has two road users, the server and a road user, and when a first road users and a second road user in respective default unions with the server have partly overlapping field of views the union that is formed will have three road users, the server and the first road user and the second road user.

According to an example of embodiment of the present invention a road user can be at least one of a person driving a car, cars themselves, persons riding motorbikes, motorbikes themselves, pedestrians, commuters, metro line, railway line, trains, aeroplane route, aeroplane, people travelling on bicycles, bicycles, road traffic reporters in helicopters, helicopters, ferry, toll road station, cafeteria, bus terminal, bus, atelier, taxi, traffic light, and also other traffic server systems etc., and similar persons and objects.

According to an example of embodiment of the present invention geographical positions of registered road users are identified by data submitted from Global Positioning System (GPS) transmitters being part of Mobile terminals accompanying registered road users of the traffic surveillance and guidance system.

According to an example of embodiment of the present invention geographical positions of registered road users are identified by data submitted from hybrid positioning systems.

According to an example of embodiment of the present invention a name of a geographical position a registered road user is located on is identified by data submitted from a relational database being adapted to geographical queries.

According to an example of embodiment of the present invention a registration of a road user becoming a registered road user of the system comprises providing authentication of the road user's identity and optionally a downloading of a mobile application program from the server to Mobile terminals the road user is registering with the server in addition to other information elements.

According to an example of embodiment of the present invention the registration of a road user further comprises adding a default shape of a field of view if the road user fails or omit to register a replaceable and modifiable geometrically shaped model of a field of view representing the road user's observation space and observation ability.

According to an example of embodiment of the present invention the registration of a road user further comprises assignment of optional parameter values modifying perception of traffic information received by the road user when being in a union.

According to an example of embodiment of the present invention parameter values as direction of travel and speed of travel or similar features can be assigned as optional parameter values.

According to an example of embodiment of the present invention optional parameter values are related to assign a user as an active user or a passive user of the traffic surveillance and guidance system.

According to an example of embodiment of the present invention registered information related to a road user is defined as a set of data being organised as an indexed collection of information elements, wherein a pointer structure in the data set is updated by the server providing information about which other data sets of other users that are in a union with each other.

According to an example of embodiment of the present invention a data set comprises updated data of geographical positions of a road user associated with the data set, and wherein data sets of a union can optionally be sorted in respective sequences with respect to the geographical positions updated in the respective data sets.

According to an example of embodiment of the present invention the sorting of data sets with respect to the updated geographical positions further also takes into account direction of movements of the registered users in the union.

According to an example of embodiment of the present invention messages sent from one road user to other road users in a union is qualified with respect to which sorted sequence of road users the road user is part of.

According to an example of embodiment of the present invention the traffic server is configured to parse a friends list in a social network of a first road user, and whenever the server identifies a friend on the list being a second road user in a union with the first road user, the server notifies both road users about their presence in the same union.

According to an example of embodiment of the present invention the traffic server is configured to identify messages related to incidents or events affecting road conditions, wherein the traffic server creates a field of interest around the geographical position of the reported incident, wherein any road user being in a union with this field of interest, or is coming in a union with this field of interest, receives push messages and advice regarding the incident or road condition.

According to an example of embodiment of the present invention wherein the traffic server system is adapted to be part of an assault alarm system, and wherein any registered user of the assault alarm system can optionally be registered road users.

According to an example of embodiment of the present invention the assault alarm system is configured to identify registered names of persons being inside the union, and also person in surrounding areas of the union, and then submit the names to a law and order enforcement authority.

According to an example of embodiment of the present invention registered road users and their registered family road users are by default inside a common union regardless of distance between family members of road users.

According to an example of embodiment of the present invention a registered road user can optionally register further field definitions of modelled fields that are qualified with specific qualifiers linked to respective actions, services and/or functions, and whenever a union of qualified fields are detected by the server system, the server system is configured to provide the necessary computer and networking infrastructure and execute computer programs facilitating the respective actions, services and/or functions assigned to respective specific qualified unions.

Respective aspects of the present invention may each be combined with any of the other aspects. These and other aspects of the invention will be apparent from and elucidated with reference to the embodiments described hereinafter.

FIGURES

The traffic surveillance and guidance system according to the present invention will now be described in more detail with reference to the accompanying figures. The accompanying figures illustrates an example of embodiment of the present invention and is not to be construed as being limiting to other possible embodiments falling within the scope of the attached claim set.

DETAILED DESCRIPTION OF AN EMBODIMENT

Figure 1A:
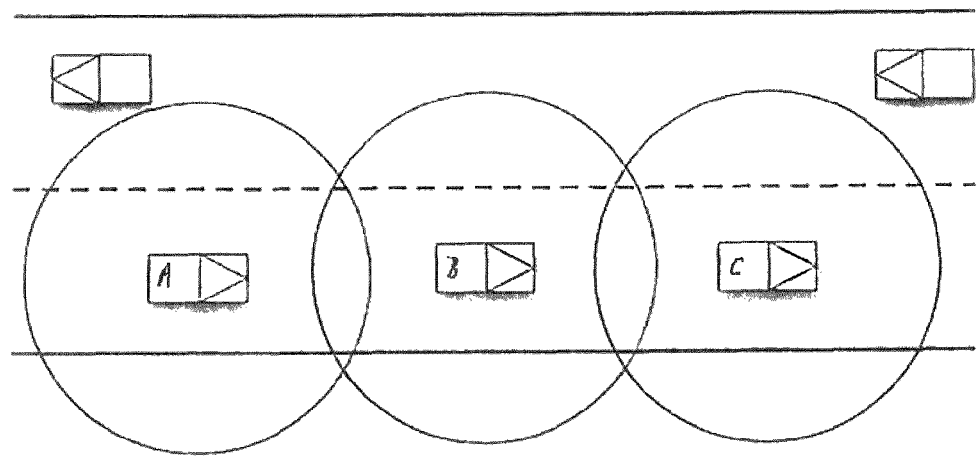
FIG. 1a illustrates an example of a union according to the present invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

According to an aspect of the present invention the term road user is to be understood as a term comprising persons driving cars, cars themselves, motorbikes, pedestrians, commuters, metro line, railway line, trains, aeroplane route, people travelling on bicycles, road traffic reporters in helicopters, helicopters, ferry, toll road station, cafeteria, bus terminal, bus, work shop, atelier, taxi, traffic light, and also traffic server systems etc., and similar persons and objects. The idea is that any persons, institutions, objects, transport means, point of interests and similar information sources etc. that can provide information and help relevant for traffic surveillance and guidance, can be registered as a road user in an example of embodiment of the present invention. For example, a petrol station may provide information about latest petrol prices and can be registered in the system as a road user. A traffic light may inform the number of minutes left before changing light colour etc.

Within the concept of the present invention, a traffic surveillance and guidance system should be able to facilitate mutual interactions between participating road users within the broad meaning of the term "road user".

A new user of the system according to the present invention needs to register his credentials like name, address, mobile phone number and similar information etc. besides information about his car if he have one, if he has a navigation terminal in his car, type of model etc., which can be updated and recorded in a user profile for example. In the user profile the user may define a geometrical shape as a model of his field of view. For example, if the user is only interested in what is happening on the ground level around for example a car when driving the car, the user can define his field of view as being a horizontal circle with centre in the car. The diameter can be defined to be for example 500 meter. If the registered road user is more interested in what is happening in front of a car when driving, it is possible to define an ellipse wherein the road user will be positioned in one of the foci while the other foci is in front of the road user, or just a rectangle around the car positioned with a larger part of the rectangle in front of the car. When for example travelling in the car, the field of view will then extend much more forward than backwards. It is also possible to define three dimensional fields of views. For example, it may be possible to define a cylinder with for example a 2000 meter height oriented upwards and 1000 meters in diameter. The reason of using such a definition of view of field is the possibility to extend the field of view of a specific road user with a field of view of a traffic surveillance helicopter that may also be registered as a road user of the system.

At any time it may be possible for the road user to replace and/or modify the geometrical definition of the field of view in his user profile. Any geometrical shape may be defined and/or be modified by a road user. In an example of embodiment of the present invention there is defined a default shape of the field of view that may be assigned by a system operator to be for example a horizontal circle with a radius of 400 meters, or any other shape and size. When the server system detects that the relative geographical positions between at least two road users implies that their respective modelled fields of views starts to be partly overlapping the server system provides at least a communication channel or message distribution process between the at least two road users. The communication channel or any type of message distribution process between the at least two road users are maintained as long as their respective field of views are overlapping, i.e. as long as the field of views are forming a union.

An example of embodiment of the present invention comprises a computer system denoted "traffic server" that is receiving relevant traffic information from a plurality of information sources, wherein the server is capable of for example communicating relevant traffic information and guidance to/from respective mobile terminals registered to road users of the system, or that are for example located in vehicles operated by the road users. The traffic server system may keep track of positions of all registered road users in a geographical area based on for example GPS coordinates, or from systems denoted hybrid position systems. For example, a relational database that has been adapted to geographical queries, for example like the commercial systems PostgreSQL+PostGIS or Oracle Spatial and Graph may be used to identify geographical names linked to geographical positions of registered users. When a union among road users are detected the server system creates a communication channel or a message distribution process between road users in the meaning of the broad interpretation of the term "road user" that facilitates interchange of traffic relevant information and help and advice between road users in the union.

When a new user of the traffic server system according to the present invention is registering his credentials, a mobile phone application (app) of the traffic system may be downloaded into the user's mobile phone. If any other type of mobile terminal is used, for example a Geographical Position System (GPS) navigation terminal, an appropriate application program may be downloaded to the GPS navigation terminal providing the same level of services and functions as with the mobile phone. In the text below the term mobile app is used to cover any type of mobile terminal for the application software being downloaded. It is further within the scope of the present invention to provide WEB interfaces of the system for mobile terminals carried by road users equipped with WEB browsers as an alternative to a mobile app, or as an additional interface to a mobile app.

It is within the scope of the present invention to keep track of positions of mobile telephones and navigation terminals being equipped with GPS transmitters with the help of hybrid position detection systems that can improve resolution of position accuracy, and which can be used inside buildings etc. and which can function in cooperation with the GPS system. For example, Cellular phone Tower triangulation methods are known in prior art, or any other device or method that can keep track of geographical positions may be used. The link below provides an overview of possible solutions. http://en.wikipedia.org/wiki/Hybrid_positioning-_system.

The traffic surveillance and guidance system according to the present invention may keep track of geographical positions of registered road users being logged into the server by receiving geographical location coordinates from mobile terminals associated with the registered road users. According to an example of embodiment of the present invention the mobile app (or WEB interface) may comprise a user selectable option of enabling active use of the system, or passive use of the system, or be logged out completely of the system. If the road user selects active use of the system the user defined geometrical shape of the field of view (or default shape) of the road user is actively used by the traffic server together with other optional functions like the relational database that has been adapted to geographical queries, for example. The passive use can restrict the server to only send alarm messages, or messages about accidents, or broadcast messages etc. to the passive user(s). The tracking of geographical positions of users will be disabled in the passive mode if selected so by the users. This is a choice a road user can use when parking at a road café for example.

According to an example of embodiment of the present invention, the traffic server may be configured to identify the perimeter of the defined models of field of views, for example the perimeter of a circle. If the circle for example has been defined to be 500 meters in diameter the system may convert points on the perimeter into relative geographical positions relative to the position of the mobile terminal of the road user for example. When the road user moves for example in a car the absolute geographical positions of the mobile terminal the road user is carrying will be tracked and updated by the traffic server of the present invention. At the same time the absolute position of the perimeter of the field of view can easily be calculated by just adding the relative coordinates of the perimeter to the absolute position of the mobile terminal. In this simple manner it is possible for the server system to detect unions of fields of views.

If a road user being part of a union departs from the union, for example if he is driving a car and stops at a petrol station he will probably no longer be in the union. This is detected by the traffic server system monitoring active road user's relative positions in unions. The traffic system may for example from time to time control the consistency of different established unions and then remove a road user that has a position disabling his possibility to be in the union, or add another road user. This is actually no real problem for the other registered road users being in the union. The road user that stopped will no longer provide relevant traffic observations to the other road users in the union anyhow. A new road user will for example be able to report additional information. When the stopped road user starts moving again, for example in his car, he can eventually be part of a new union when his field of view again starts overlapping with another field of view of another road user (or the previous union if he catch up with these cars again on the road), or an already initiated and existing union. If a road user is in no union at all with other road users he may still be in a default union with the server. In this manner the traffic server can update the road user with traffic information if necessary. It is within the scope of the present invention that besides providing communication channels or a message distribution process providing update of traffic conditions in a created specific union of road users and between road users in the union, the traffic server can also be registered as a road user in itself. Therefore, in an example of embodiment of the present invention, there will always be a plurality of respective individual default unions created between the traffic server in the system and each respective registered user. This example of a union is based on a concept of logical overlap of the field of views of the road user and the broad scope of traffic conditions the traffic server may observe and receive. The default unions have two road users, i.e. a user and the server. If another user becomes a road user of this union the union will have three road users. The server, the first user, and the second user are then road users. If the union is split the first user will remain in a union with the server while the second user will also remain in a union with the server.

The example of a default union between a road user and the server indicates that there may be different needs for communication channels between participants of a traffic surveillance and guidance system. Within the concept of the "field of view" the inventor of the present invention has realized that there is a broad concept related to the term "field" while the term "view" is a qualifier of the broad term "field". With reference to field theory of physics the term "qualifier" can be viewed to be equivalent to the use of terms like gravitation, electromagnetism and hence to the field theory of gravitation, the field theory of electromagnetism etc. The qualifier then indicates the type and nature of the interactions that may appear within the qualified field. Therefore, in an example of embodiment of the present invention the field of view of the server system may be denoted with a qualifier "server" which implies that there is a server field and road users may have an optional field denoted "user field". Therefore, the server system may operate with the field of views and detect unions between road users independently of operating other types of qualified fields and create communications between road users of unions and actions between road users of such respective unions independently. It will therefore be possible as indicated above with a union between fields of views of road users (drivers for example) and a plurality of unions formed between the server field and respective user fields at the same time. Other examples of such types of unions are described below.

The creation of a union triggers an establishment of communication channels or a message distribution process between mobile terminals being registered to roads users in the union. A more detailed description of examples of communication and message distribution is provided below. Further, within the broader concept of "field" with a "qualifier", a union may also enable interactions with specific actions, functions and/or services for road users in the union.

According to aspects of the present invention, it is not necessary to request membership of a union because it is not a membership as such. A union is a sharing of field of views (or other types of qualified fields) among road users and the observation ability of each respective road user (or other actions, services and/or functions). The creation of a union is based on the relative movements between users, i.e. if they are moving towards each other, or from each other. It is never the road user as such that is important. It is the sharing of the observation capability of road users that is the reason for establishing unions of field of views for example. Therefore, it will never be a problem that a road user stops being in a union with other road users. Further, a meaningful union may be established between only two road users. Further, the purpose of tracking positions is limited to detecting overlaps of fields and not positions as such. Therefore, there is only a temporary need for keeping an association between a road user identity and a mobile device limited to the duration of a union. Further, there is no need for other road users of a union to know identities of other road users in the union. A message can then be distributed within a union without any other association than to the union, and within the union the identity of respective road users do not need to be visible or known. In this manner the present invention allows a random number of people that are randomly located relative to each other within a random time spam to share for example their fields of views and observation capability within the random time span.

In addition to the ability for a road user to distribute messages to other road users in a union, the current server can receive traffic information from other centrally located servers receiving traffic information from authorities like police, road authorities, road companies, etc. in addition to messages that are recorded from ordinary road users as described above. The server can then push messages to those road users that are in need of the information. This can be achieved for example by a traffic server according to the present invention, for example by converting GPS coordinates of an incident, or of an event creating specific types of road conditions, into a geographical coverage area which can be denoted as a field of interest. The server can in itself be a registered road user, and by entering the system as a user being active with a defined field of view (or interest) covering the identified area of the incident, the current server can form unions with all users being present in the field of interest (i.e. the geographical coverage area) of the server for a specific message or messages, and can then start to push messages to these road users that it is relevant to inform due to their geographical positions. The traffic server may also create a Point of Interest as a road user with a fixed geographical position of the geographical position that is reported for the incident or event. In this manner the server can push messages to road users that due to their current position and movement may be affected by the incident. The relevant road users can also be identified with respect to direction of travel and queue conditions etc. and can comprise warnings of queues together with proposals of alternative routes.

How large a field of interest created for example by a traffic server may be, or should be, may be calculated with the help of prior art traffic analysis programs, or just by simply making an estimate for example based on traffic load in the area in question. Further, it is also possible to detect changes in the traffic situation making it possible for the traffic server to inform road users of other alternative routes, for example. Therefore, this solution makes it possible to achieve a dynamic system providing push messages that are qualified and which are relevant for those road users receiving these messages and which is receiving the messages at any given time.

In other examples of embodiments, it is possible that a metro line or a railway line etc. is registered as a road user in the system. The definition of the field of view of a metro line can be as a combination of a field of view representing the metro line itself, i.e. the tracks, and a plurality of fields of views surrounding each respective metro station. Therefore, the field of view for the metro line is a union of the track and the respective fields of views around each respective station. In an example of embodiment of the present invention it is therefore possible to define a "track field" and a "station field". When an ordinary registered user like a pedestrian is making a union between one of the field of views of one of the metro stations he is automatically in union with the whole metro line. Therefore, he can receive traffic information from the operator of the metro line being relevant for the specific metro station he is adjacent to as well as other pedestrians being in the vicinity of other metro stations, or are standing on respective platforms underground, as well as from a central traffic coordination centre of the metro line being in a default union with the metro line. In the union it is then possible to inform respective users on each respective station about delays and expected arrival time of for example a metro train.

Another example of a road user can be a road itself. If a road between two cities is registered as a road user in the system, the road itself can have a field of view representing the road itself, while entry or exit points on the road (i.e. road crossings etc.) can be registered as separate road users having a field of view representing the area close and around the entry and exit points, a road user driving a car can come in a union with the road itself through a union with a field of view associated with an entry or exit point of the road. Therefore, the road user can then receive traffic conditions from the road itself (i.e. from any point on the road) as well as relevant information related to the entry or exit points of the road the road user is in a union with. It is also possible to provide a segmentation of the road into several fields, for example road field 1, road field 2 etc. Then information, help and advice is also segmented with respect to which road field a road user is in union with. This kind of information comes from there server that has received information relevant for the road or road segment for the information sources the server is collecting information from, included the road users themselves. If there is a queue on the road, for example at an exit point, a registered road user may receive information from road users being in union with other road users in front of the queue and being close to the specific exit. This can happen even if the queue is long. When this happens the road user can easily decide to drive to the next exit if necessary dependent on the reason for the queue, for example. In this example of embodiment of the present invention the field of the road may be qualified as a road field (or road field segments) and exits may be qualified to be exit fields etc.

Another example of a road user can be a petrol station that has defined a field of view enclosing entry points and exit points of the petrol station area. When a road user comes in a union with the petrol station, the petrol station can provide information about opening hours, services that are offered and price on petrol to other road users. In an example of embodiment of the present invention the field of the petrol station may be denoted "field of interest". A user may also define a field of interest in his user profile in addition to the field of view.

A traffic light may be a road user. Whenever a car is driven by a road user, a union between the driver and the traffic light would make it possible for the traffic light to provide information of the time left to the next shift of light, or that the traffic light is out of order etc. If the field of view (or field of interest) of the driver (road user) is for example 500 meters, the driver would receive these notifications in due time before arriving at the crossing where the traffic light is positioned.

A public video camera providing images of road conditions to a traffic authority may also be registered as a road user in the system according to the present invention. Such video cameras may be registered with a "video field" and road users that have video display capabilities in their cars can also register a "video field". Whenever there is a union between respective road user's video fields and the video field of the public video camera a video stream is submitted from the public video camera to the road users of the video union. Within this concept it is also possible to create unions between respective dashcams installed in respective cars driven by road users of the server system and that has a defined video field in their user profile. The user profile can then also have a description of the video camera model, an assigned Internet address of the dashcam or video camera etc.

In another example of embodiment of the present invention a registered road user may be a shop or a café or a petrol station or a toll road station for example. The common feature of such users is that they offer services and goods for sale. Therefore it is within the scope of the present invention to provide a system of a supplier field that may form unions with road users having a consumer field. In such unions a secured transaction system may be enabled thereby facilitating payment from a consumer to a supplier for purchased services and/or articles.

Road users representing objects that are stationary, for example a petrol station etc., will not change their geographical positions. However, when detecting possible unions the traffic server according to the present invention investigate the relative movement between road users.

In another example of embodiment of the present invention a car may also be registered as a road user with a "car field" definition and a user may have a "driver field". A union between a driver and his car can for example be used to establish a remote control channel (via a mobile phone for example) between a mobile device the driver carries and different functions of the car. For example it can be possible to start a separate motor heater if it is cold outside. Further, there can also be possible to create an alarm or a warning if the union between the car field and the driver field is broken. This can indicate a car theft, or that the car is towed away because of parking restrictions etc.

In another example of embodiment of the present invention it is possible to provide fields like "Check in field" and "Check out field" and for example a "passenger field" for a road user. A union between a Check in field and a passenger field can be used to update departure time and the time the passenger would need to use to reach a check in counter from his current position at an airport for example. Similar functions can be adapted to a Check out field.

In another example of embodiment of the present invention, a registered road user may stand on the curb of a road hoping to get a lift with a passing car. A road user may define a "request field" and whenever a union between a car driver and a user standing on the curb is identified by the traffic server the server initiate a message from the road user standing on the curb with a request for a lift. The drive may then answer and stop to pick up the road user. Further, it may be optionally implemented a session where both the car driver and the road user standing on the curb reveal their true identity. This controlled by the server by checking the respective registered user profiles. This is an example of an action that can optionally be implemented in a union of qualified fields.

An interesting consequence of the concept of "field" and respective qualifiers of the "field" is that such fields and assigned functionality and actions of such fields can be operated independently of each other. This simplifies the architecture of a traffic surveillance system with optional services provided through the server system. For example, a union between a field of interest of a petrol station and a field of interest of a user defines a unidirectional communication channel from the petrol station to the user. The same situation applies with a traffic light etc. Further, the field of interest can be modelled as a geometrical shape that is completely different in shape and size compared with a field qualified to be a person's physical observation space (field of view) for example. In a sense the qualifier of a field impose restrictions on both the type of information and the type of actions and/or functions that are allowed in a union formed between qualified fields. Further, different qualified fields can by default be disabled to form unions. In this manner the architecture of a server system according to the present invention can be designed as a layered system wherein respective layers represent different fields that are operated by the server. This also provides a possibility to scale server systems according to load inside respective field types. Further, respective fields and corresponding actions and functions adapted for a specific type of field can be assigned to different physical servers. Further, this concept of field and layers in the server system provides also a simple structure to filter information and thereby mitigate any information overload situations. Fields associated with accidents may always be up and running while various interest fields may be temporary disabled. A user can also enable or disable certain fields that he has defined in his user profile. Thereby the user himself can have control over the information and functions and actions or services that the user can access through his membership in the server system. The concept of "field" with a "qualifier" simplifies not only the architecture of the server system but also the interaction model of the system between users with respect to information flow, information content, and respective actions and/or functions.

According to another example of embodiment of the present invention, a registered user defining a field of view may provide other settings modifying how a union will act on his perception in the field of view, and also what kind of traffic conditions that will be reported to him from a union. For example it is possible to identify that it is only information and guidance with respect to traffic in the direction of his travel that is of interest for the road user.

It is also within the scope of the present invention that a server according to the present invention can limit a number of road users that are allowed to be within a union. However, the possibility to limit a number of road users of a union can be different for specific types of fields a user has defined in his user profile. Within the concept of making unions of field of views it is natural to limit the size or geographical span of a union since it is probably of no interest to form a union of all cars in a whole city for example. However, if there is a queue on a highway it is possible to foresee benefits of creating a union stretching along the road that may have all cars in the queue as road users of a union, even if the queue is several kilometers long. Then road users in front of the queue can provide important information about the progress of the queue for example. If the field of views of cars on this road then are segmented, i.e. less road users in a plurality of respective unions, another field definition may be used to create a union having all cars in the union, but which has limited interactions between the road users of the union, for example the one or two cars in front of the queue may be the only allowed road users to send information, or the field is a broadcast field that the server may use to convey status of any queue and possible other roads that people can use.

It is also within the scope of the present invention that a traffic server may on its own initiative establish a field definition among users the server identifies as being in need of extra communication, help or services due to identified emerging traffic conditions.

In another example of embodiment of the present invention, qualifying messages as relevant for certain road users of unions or a group of road users inside unions or for all road users of a union can additionally and optionally be achieved with an arbitration process that may be activated by the message distribution process before the messages actually are distributed in the union. For example, the arbitration process may pop off messages from message stacks and compare time stamps and standardized keywords in the messages for example to qualify if there are contradictory messages to be distributed (for example "queue" and "no queue" at almost the same time), and then decide if the new message actually should be distributed. Another example of reason why a message should not be distributed is that the message is too old. In an example of embodiment any message older than 15 minutes may be regarded as an "old" message. Other time limits may also be used. There are other examples of what an arbitration processes can be used for, for example verifying if there is a queue by for example controlling speed (previous and current GPS position and time stamp) of other road users in the specific linked list or union. These are some non-limiting examples of arbitration and content qualification of messages according to the present invention.

In FIG. 1a there are three road users A, B and C travelling in the same direction that has formed a union. The field of view 10 of user A overlaps the field of view 11 of user B that overlaps with the field of view 12 of user C.

Figure 1B:
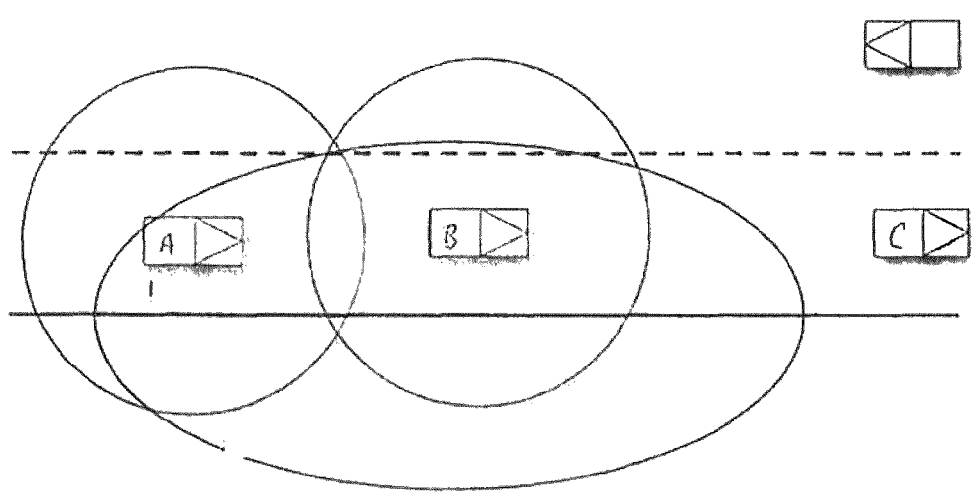
FIG. 1b illustrates another example of a union according to the present invention.

FIG. 1b illustrates a union between a static point of interest with a defined field of view 13, for example a petrol station, being in a union between itself and road users A and B travelling in the same direction. A system according to the present invention is configured to track geographical positions of moving objects as basis for forming unions with communication capabilities. However, a petrol station is stationary and will never move. However, it is the relative movement between objects that counts, and therefore it is within the scope of the present invention to register and use for example stationary GPS coordinates of a stationary object. Such coordinates may then never be updated further by the system.

Figure 1C:
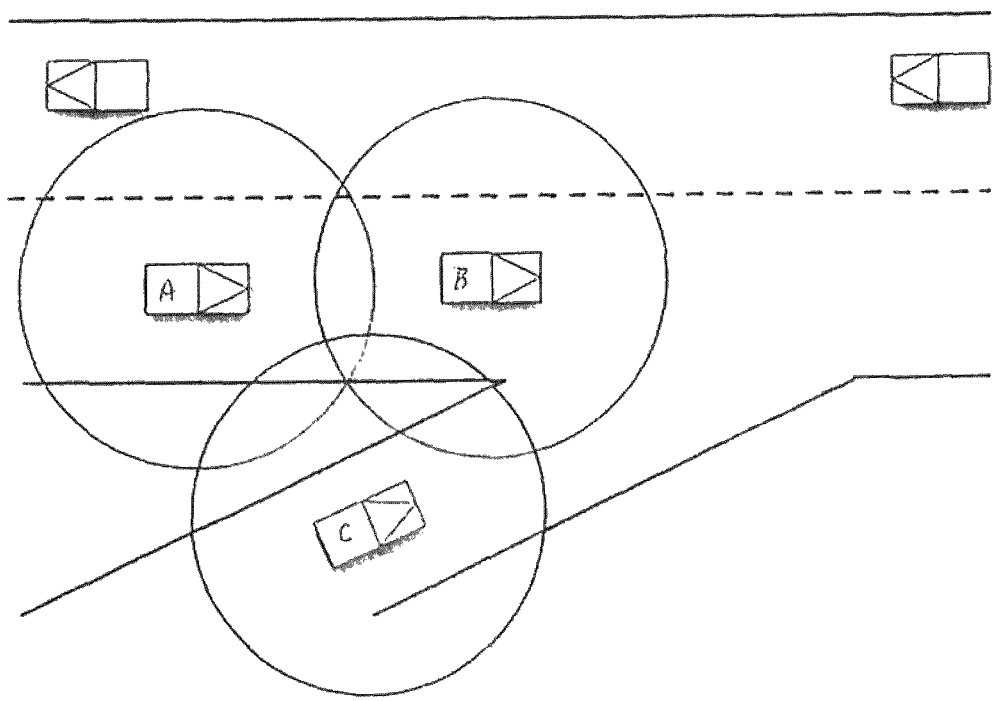
FIG. 1c illustrates another example of a union according to the present invention.

FIG. 1c illustrates a situation wherein a road user coming from a side road in car C entering a main road and is forming a union with road users driving respectively cars A and B.

Figure 2:
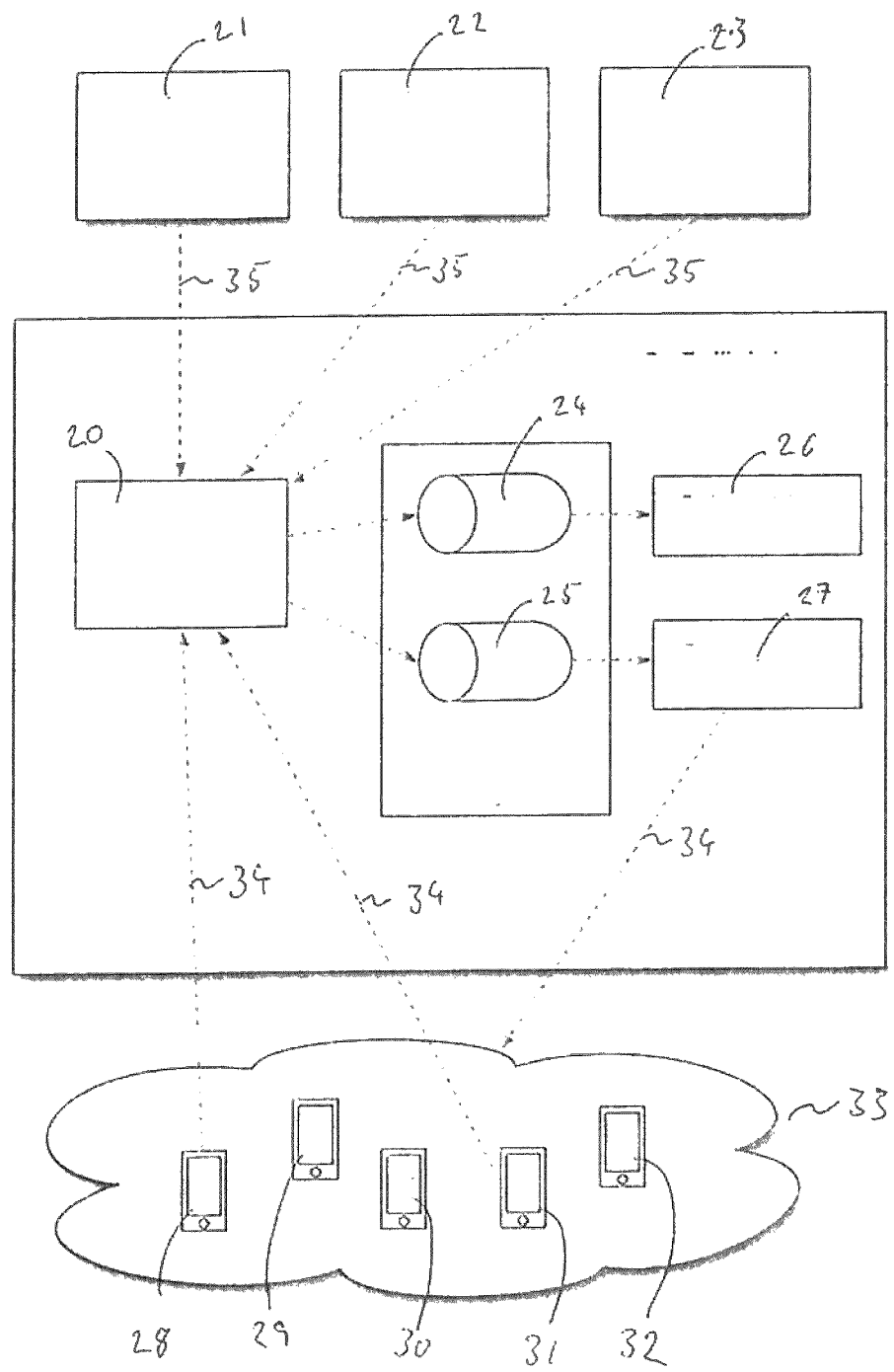
FIG. 2 illustrate an example of a system according to the present invention.

FIG. 2 illustrate an example of system architecture of an example of embodiment of the present invention. The traffic server 20 is receiving traffic related updates from different sources like the information providers 21, 22, 23. Information provider 21 may be a road maintenance company, information provider 22 may be a public transport information provider, and information provider 23 may be an air traffic information provider.

Traffic related messages are processed in the traffic server and may then be transferred to a traffic message queue 25. A dedicated traffic message processor 27 is then responsible for sending a push message to relevant registered road users 28, 29, 30, 31, 32. The system may keep track of all geographical positions of registered users via GPS coordinates and a geographical relational database being part of the traffic server 20 as mentioned above thereby qualifying messages to be relevant for specific unions the respective road users are located within. The message process will also take into account if a road user is active or passive as discussed above.

If some registered road users 28, 29, 30, 31, 32 is forming a union 33 as depicted in FIG. 2 the geographical positions of road users in the union 33 is put in a user position queue 24 being processed by a user position processor 26. The traffic message processor 27 and the user position processor 26 will then together be able to send relevant messages to a formed union 33. With reference to the disclosure above, communication to/from the traffic server to road users in a union, and between road users in the union may be performed via a message link 34 established within the specific union. Examples of message handling systems can for example be implemented within a publisher subscriber architecture as known to a person skilled in the art, for example as middleware.

Format of messages being used for example in a message-oriented middleware are made as structured as possible thereby providing a possibility to perform filtering, routing, and translation between languages for example. A typical message about an incident on a road may comprise: direction of travel, type of incident, location of incident, and optional additional information like a voice mail message, or a video, or a recording of sound/voices. It is also possible to use colors in messages, for example red to signify danger or green to signify clear road forward etc.

Figure 3A:
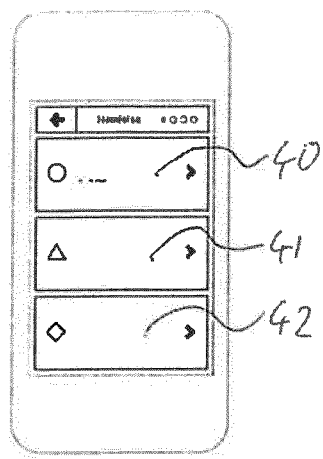
FIG. 3a illustrates an example of an interactive display interface according to the present invention.
Figure 3B:
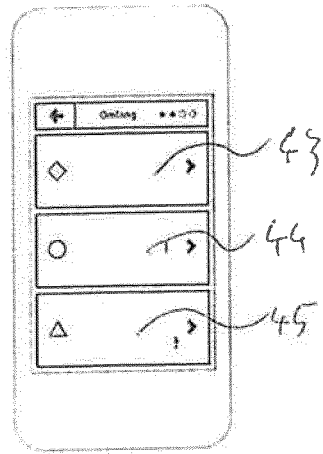
FIG. 3b illustrates another example of an interactive display interface according to the present invention.
Figure 3C:
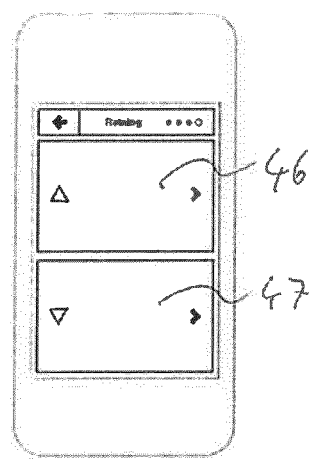
FIG. 3c illustrates another example of an interactive display interface according to the present invention.
Figure 3D:
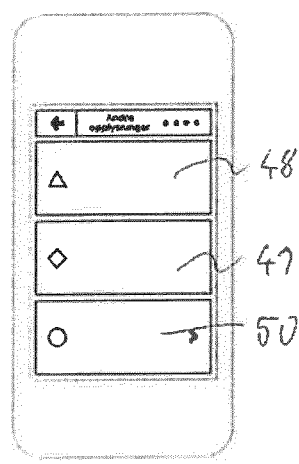
FIG. 3d illustrates another example of an interactive display interface according to the present invention.

FIG. 3a illustrates an example of layout of a display on a mobile phone registered to a road user of the system. This is an example of a hierarchical menu system suitable for a mobile phone with a limited display surface size. Other types of smart phones with larger display surfaces may have more choices visible in a more horizontal menu structure. The main type of menu system may be used in a GPS navigation system. In FIG. 3a it is listed three different main categories of messages. Each message has its own graphical symbol (circle, triangle, square) and an optional plain text. Choice with reference numeral 40 is related to queue, 41 are related to accidents, and reference 42 is related to road conditions. If a road user wants to report about queues the road user touches menu icon 40. Then a new image can come up on the display of the mobile terminal as disclosed in FIG. 3b. It is then possible to characterize the queue as being large 43, small 44 and unknown 45. When this choice has been activated a third image may be displayed providing a possibility to identify driving direction. In FIG. 3c it is disclosed a menu choice 46 "My direction" and the menu choice "Opposite direction" 47. The last displayed image in this session is disclosed in FIG. 3d. In this menu section it is possible to add additional information. Menu choice 48 makes it possible to add a voice mail message i.e. the mobile app will open up a voice recording program in the mobile terminal, while menu choice 49 will open up a text editor providing a possibility to add additional free text to the message. When the road user has finished with his optional choices for the message, the road user can touch the menu choice "Send" 50 that distributes the message among road users in the union 33.

In another example of embodiment a road user may report a situation where in the traffic slows down which might indicate a severe queue problem. When the same road user experience that the traffic seems to move forward at a higher speed he can also report this situation. The server can then record this situation, and based on the time between the two reports and geographical positions the server can update information about the queue problem with respect to probable size and latency for the traffic, and which can be distributed to unions and/or respective passive road users coming towards the problematic area. The server may also compare the reported status of the queue with other information sources.

Figure 4A:
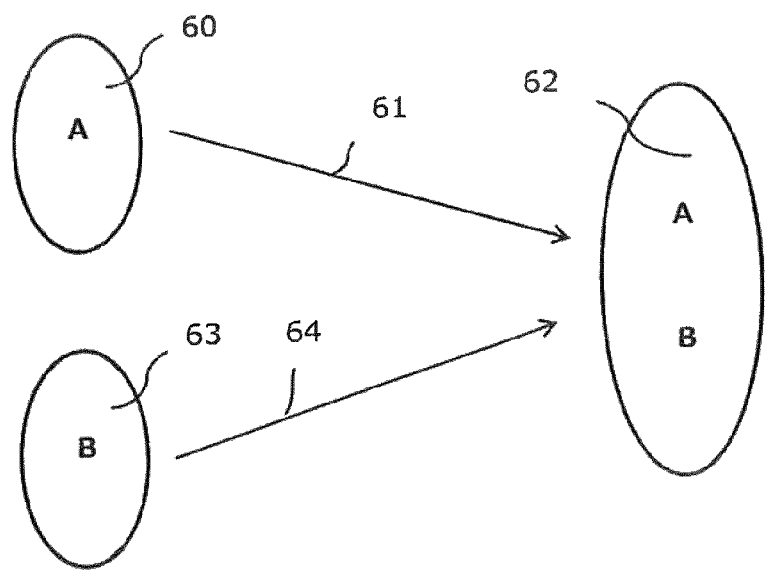
FIG. 4a illustrates an example of forming a union according to the present invention.
Figure 4B:
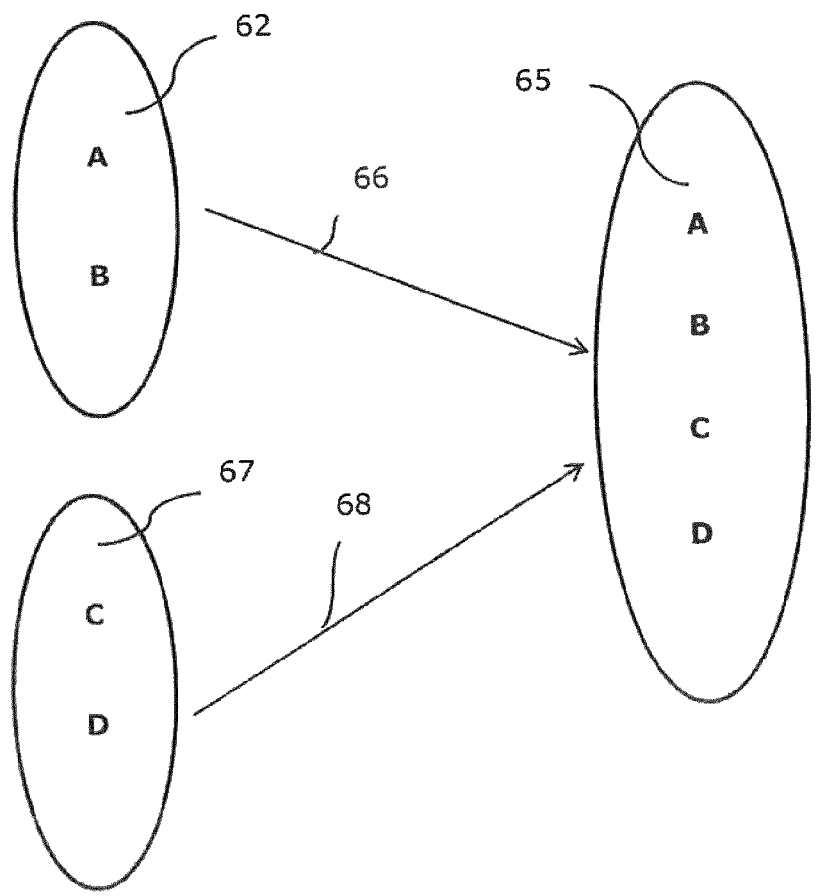
FIG. 4b illustrates another example of forming a union according to the present invention.

In FIG. 4a there are illustrated two data sets A and B respectively associated with a user A and user B. The data sets may be viewed as the user profile being registered and updated for a user, but can also be an additional part of a user profile. In FIG. 4b the respective users associated with data set A and data set B are moving geographically close to each other and can form a union as indicated with the arrows 61, 64. Internally in the server, the union that is created can be viewed as a new data set U1 (reference numeral 62 in FIG. 4a), (union one, for example), with the information elements from data set A and data set B combined. The system can then also provide an ID for the union, for example U1.

If there is a union U2, as depicted in FIG. 4b with reference numeral 67, between other registered users defined in corresponding data sets C and D, a union U3 (reference numeral 65) may be formed between U1 and U2, which is indicated with the arrows 66, 68. In an example of embodiment, the server may, when a union is formed, provide an updating of a combined field of views and other fields that are defined in the respective user profiles.

Figure 4C:
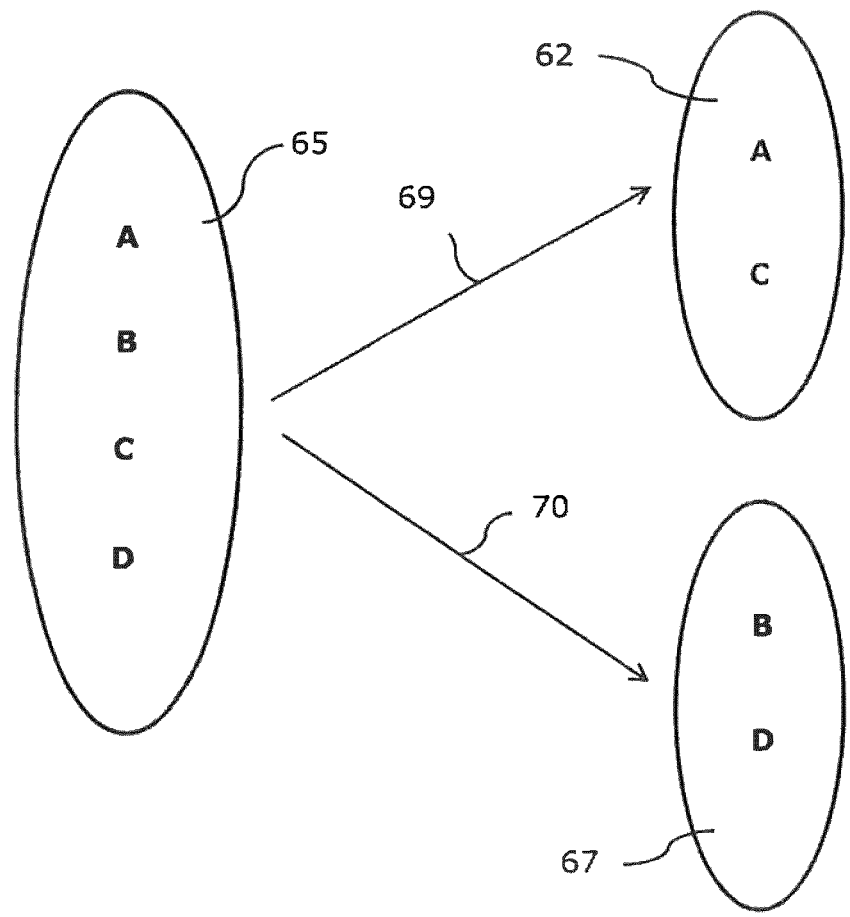
FIG. 4c illustrates an example of splitting a union according to the present invention.

When a road user of a union is leaving a union, this can be detected by the server, for example by detecting a change in distances between respective GPS positions in the updated data sets of users in a union. The process of detecting a road user of a union leaving the union can also be detected just by a process that at regular time intervals re-establish a union according to the respective distance rules derived from the respective defined fields of views. This is possible since the goal of the present invention is not to keep track of individual road users as such, but merely to identify unions and maintain communications or message distribution processes inside unions. If none of the road users of a union being re-established no longer satisfies the distance rules or other rules, the union is automatically dissolved since it will not be re-established. In FIG. 4c it is illustrated how for example U3 is split or re-established again into separate unions U1 and U2. However, when a union is split or re-established the road users in the respective unions U1 and U2 can be different from the situation when U3 first was formed.

Figure 5:
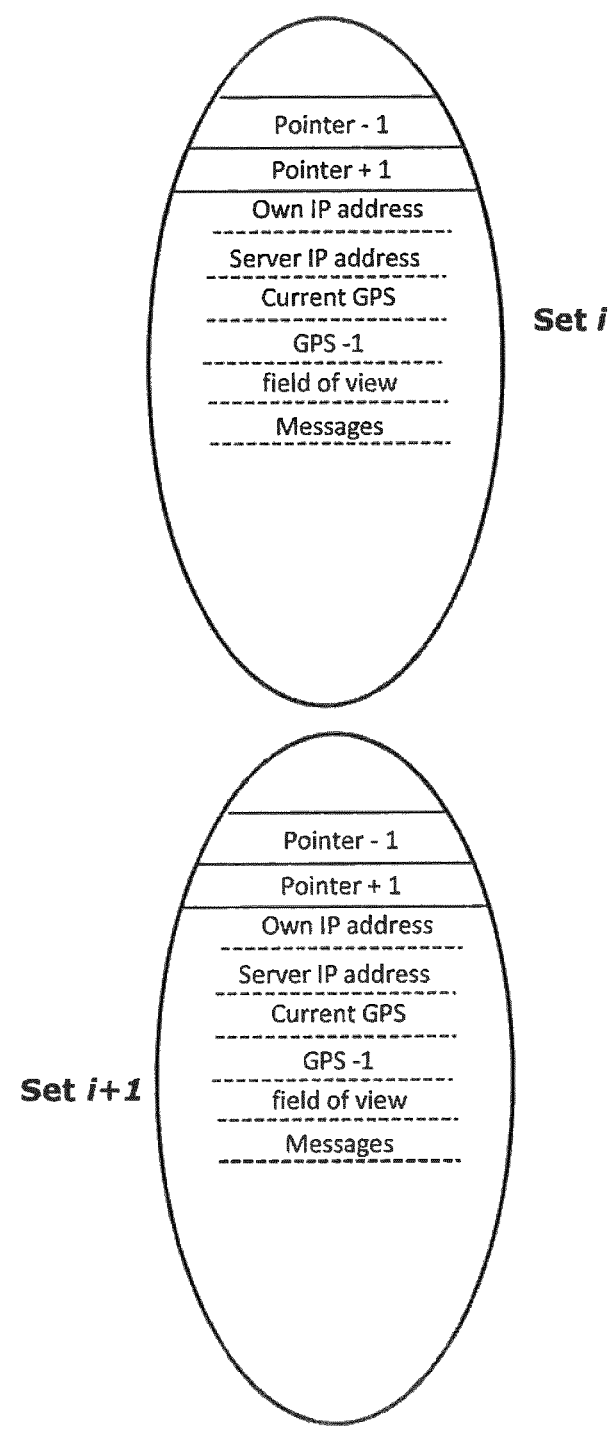
FIG. 5 illustrate an example of a data set structure according to the present invention.

An example of a data set as referenced above is illustrated in FIG. 5. Such sets of data may be configured as a matrix with information elements, or an indexed collection of information elements, and each respective information element can be arranged and accessed with indexed addresses as known to a person skilled in the art. A same data set structure may be used for every kind of object being registered as users in the server system according to the present invention. The same data set structure may be used for a road user, a point of interest (POI), a shop, a tramway etc., but the actual content may differ as well as the use of a specific set of data. When a person or institution etc. is registering credentials with a server according to the present invention, some information elements are initialized such as a description or definition of a field of view the user wants to have. If the user omits registering a specific shape of the field of view, a default shape, for example a circle with diameter of 400 meter, or 200 meter etc., is set by the server. In another example of embodiment of the present invention a user might register other mobile phones or additional mobile units with GPS capabilities. The term "Mobile terminal" denotes all kind of units that might be used by road users, and other types of users, utilizing servers according to the present invention.

The traffic surveillance and guidance system according to the present invention can be a distributed system of servers across regions, cities, urban areas etc. but also across country borders. Therefore, it can be a plurality of server systems according to the present invention that cooperate and interchange data when a road user leaves a geographical area covered by a specific server, and comes into the geographical area covered by another server according to the present invention. According to another aspect of the present invention, a distribution of a plurality of servers may also follow the respective qualifiers of fields that are used.

In an example of embodiment of the present invention the Internet address of the server the user is in contact with (for example via a WEB page) when registering, or is logging in as a user from for example a Mobile terminal in his car, will be part of the data set belonging to this specific user. When a user is logging in to the server with his user name and password, the data set associated with the user is identified and the server reads out the current GPS position the road user actually are located on and updates the data set. Based on the GPS coordinates the server can decide if the road user now is in a geographical area served by the server. If the road users geographical position indicates that he should be served by another server, for example in another, city or country etc., the server transfers the data set associated with the road user to this specific other server, and may also update "current" server" address in the Mobile terminal of the user. In FIG. 5 the information element "current server" will be updated with the Internet address of the server serving the road user at any time. The information element "previous server" is the IP address of the server the user was in contact with within a specific geographical area before leaving this area and coming in contact with to new server in a next geographical area which then will be recorded as the "current server". Therefore, the update will be just to push the "current server" down to "previous server" each time a server change takes place because of a change of geographical area.

The server identified by "current server" is configured to track GPS positions of users and whenever a user leaves a geographical area served by the current server, the current server moves the data set of the user to the next server serving the next geographical area. This information may also be updated in the Mobile terminal of the user. By keeping a record of near history events the server can keep track of unions stretching across respective geographical areas, and which can be used to move all road users of a union across a geographical area of a server, or provide a split of the union etc. The assignment of servers to different geographical areas provides a simple mean of distributing load on the total system. In a sense a system of servers according to the present invention may be distributed across geographical areas just like cellular phone towers.

When a server is assigned to a restricted specific geographical area it is also possible to download a topological model of road systems, streets in cities, geographical hindrances, bridges, traffic lights, video surveillance cameras etc. When a geographical position of a road user is recorded the position of the road user inside the topological model can be identified. Based on the position and the information in the topological model the server system is capable of providing advices.

There is also an information element denoted "messages" in examples of a data set according to the present invention that are updated with current messages with date and time stamp sent within a union, or from current server. This will be explained in more detail below.

There is also an information element about current GPS positions of road users that is updated by the current server, for example at periodical intervals. A Mobile terminal can submit GPS positions via a prior art TCP socket (see below regarding messages), and/or the server can query Mobile terminals at regular time intervals, or as part of other functions and events in the server that can happen at random time intervals etc. The set of data can also comprise the last GPS position identified before a new update of the GPS position is done. In this manner it is possible to identify the direction of travel of the road user, or if the road user is standing still. GPS positions may be read out with time stamps thereby also providing a possibility to estimate speed of travel, or if there is a queue this traffic condition can be verified just by comparing the speed estimate of other road users in a union or unions on a same road.

If for example the field of view defined in set $S_i$ in FIG. 5 overlaps the field of view of set $S_{i+1}$ a union is created. Details of how respective GPS positions and field of view definitions can be used to detect a union between road users are disclosed below.

Figure 6:
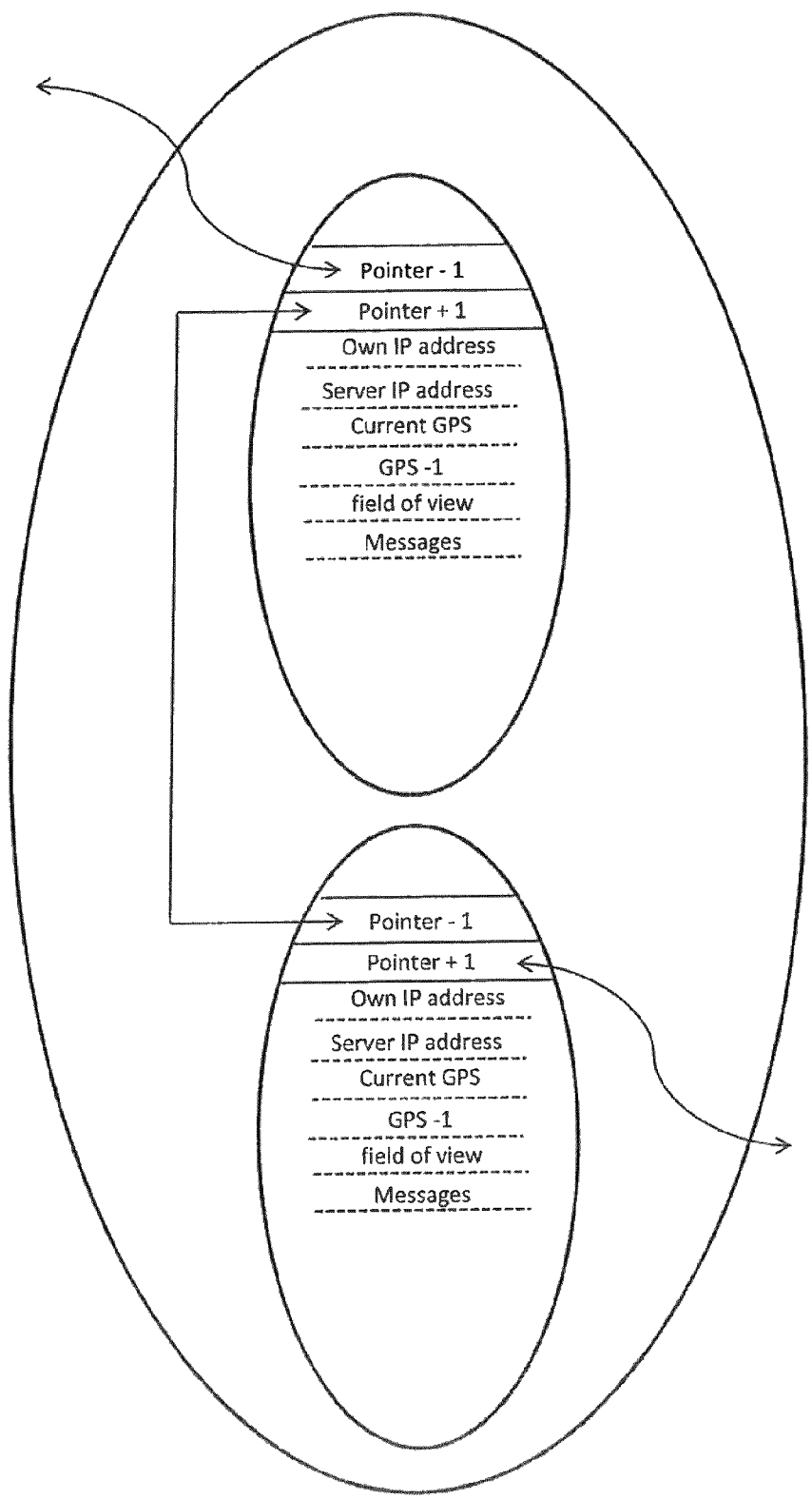
FIG. 6 illustrate another example of a data structure according to the present invention.

According to an example of embodiment of the present invention, a union is created simply by updating pointers as known to a person skilled in the art in each respective set of data associated with each road user coming into a union. In FIG. 6 a union is formed between set $S_i$ and set $S_{i+1}$ just by assigning a pointer "Pointer+1" to $S_i$ that points to the location storing the pointer "Pointer −1" of $S_{i+1}$. If these two sets are the only road users of the created union, the pointer "Pointer−1" of $S_i$ is set to "NULL" indicating an end of the pointer chain, and the pointer "Pointer+1" of $S_{i+1}$ is also set to "NULL" to indicate the end of the pointer chain in the other end. Therefore, the union will be bounded and be identifiable among a plurality of sets associated with a plurality of users by two pointers that are "NULL" in a respective start and end of a linked list of data sets. If a user with an associated set of data $S_j$ (not shown) is not in a union, both the pointers "Pointer+1" and "Pointer −1" of $S_j$ will by default be set to "NULL". In this simple manner it is possible to identify both single road users as well as respective unions of road users.

The pointer structure given as an example with reference to FIG. 6 comprises a forward chain of pointers and a backward chain of pointers. In FIG. 6 and in the description this has been simplified by using arrows and referring to pointers as pointing in both directions. In a practical example of embodiment there will be separate chains of pointers. A person skilled in the art knows how to program and use linked lists. There is an overview disclosed in a lecture note by R. Baumann of Hochshule Für Technik, Rapperswil, "Module Info1-Informatik 1 Learning Exercise—Linked Lists" that provides code examples of typical operations with linked lists.

If the union illustrated in FIG. 6 is coming in a union with a third road user with a data set $S_j$, the field of view of the third road user will overlap either the field of view defined in $S_i$ or $S_{i+1}$, or be overlapping both fields of view defined in $S_i$ and $S_{i+1}$. However, a union $(S_i)U(S_{i+1})U(S_j)$ will be formed if the field of view of $S_i$ or the field of view of $S_{i+1}$ overlaps the field of view of $S_j$ as known in set theory. Therefore, the process of determining the membership of a third road user with a data set $S_j$ can be achieved by parsing the sets of data between the "NULL" pointers encapsulating the union and compare the field of views of the respective road users of the union with the field of view of $S_j$, and if one of the defined field of views overlap the field of view of $S_j$ the new road user defined by the data set $S_j$ is incorporated into the union.

Therefore, the only required task when incorporating the data set $S_j$ is to update the <<NULL>> pointers in one of the ends of the linked list defining the union. Since the data set of $S_i$ has links pointing "upwards" ("Pointer−1") and "downwards" ("Pointer+1") to other data sets of other road users of the union, it is possible to parse the nested pointer structure as depicted for example in FIG. 6, and the pointer field "Pointer+1" of a Set $S_i$ in one end of the linked list can be set to point to the "Pointer−1" of $S_j$ while the "Pointer+1" of $S_{ij}$ is set to <<NULL>>. In this manner it is only necessary to identify one overlapping field of view among all fields of views in a union, and a new road user is incorporated into the union just by updating corresponding pointers in the linked list defining the union. Further, the server does not need to keep track of unions as such. A union is identified by identifying one of the road user of a union, for example via a GPS position related to the road user, and then parse the linked list of the union in both directions until a "NULL" pointer is encountered in both ends of the list. Thereby it is possible to identify unions as well as single users (users that are not road users of a union).

A similar process of updating pointers in the data sets associated with users can be performed when a union is split. For example, if the third union $S_j$ is no longer in the union, this can be identified by having a process checking consistency of unions. In an example of embodiment of the present invention, all unions may at regular time intervals be dissolved and then reassembled again. In this manner the unions will comprise the correct road users at any given time interval. The split is achieved by updating the respective pointers in all the involved sets of data of road users. The process will even create a spilt of a union as depicted in FIG. 4c into to new unions.

In another example of embodiment of the present invention the set of data linked with pointers in a union can be sorted with respect to for example the value of the "current GPS" position of the road users in the union. If road users are driving in a same direction on a same road the information sharing can be more consistent, and the combined "field of views" will also be more consistent with respect to what a road user can view in the union. When viewing forward it is actually a "viewing" forward that is preferred and not in random directions dependent on which union road user is at which position in the linked list defining the union.

Since a data set may comprise both current GPS position and previous GPS position it is possible to sort road users in a union driving for example on a same road also with respect to direction of travel. There are often two lanes on a road and road users can be in a union despite opposite direction of travel. However, the traffic information road users have when coming towards a road user traveling in the opposite direction in the opposite lane can be of importance to the road user because information is coming from a location the road user is about to approach. Therefore, it is possible to create more than one linked list of road users in a union, for example a linked list of road users for each lane on a road.

If there is a highway with multiple lanes in it can be advisable to create a separate linked list for those road users traveling in the lane on the far side of the road, for example. This lane is usually for cars departing off the highway to another road and traffic conditions for cars travelling in this road may be completely different from the conditions for the road users driving in other lanes on the high way. It is also possible to use the GPS positions and correlate these with existing road maps. Then actual city names, road lanes and destinations etc. can be identified and the current server can collect traffic information from other sources, for example from police of a specific city. Further, it is also possible to sort road users traveling on side roads of for example a main road identified by the GPS positions of road users in the union on these side roads, which can also be sorted further into linked lists related to driving directions.

These examples of sorting road users of a union with respect for example to the geographical positions are examples of how it is possible to qualify message to road users that are only relevant for those road users.

A union is bounded by "NULL" pointers in both ends of a linked list. When incorporating other linked lists in a union as discussed above, the header and footer of the linked list defining the union can be followed by links defining start of "to the left" linked lists, "to the right" linked lists, "opposite direction" linked lists etc. and the footer of each of these links ends up in the footer of the linked list of the union. The literal meaning of the words "to the left" etc. are of course dependent on the direction of travel a road user actually is doing. However, the server is capable of correlating the content of such linked list with the direction of travel of a road user and can therefore interpret "to the left" etc. as being on the left or right of the direction of travel.

This concept does not violate the possibility to use the same data set structure for a single user as well as for a complex data structure of a union. The only requirement is to set pointers that are not used or that terminate lists in both ends of the lists to "NULL" as known to a person skilled in the art.

In this manner it is possible to qualify the concept of making unions of field of views to actual physical surroundings with traffic. This again enables the current server to qualify messages sent in a union, not only to all road users of a union, but also with respect to possible interest of the information that is sent out. It is of no interest for a road user to receive information about accidents that has happened at a location the road user is leaving behind. However, road users traveling in an opposite direction can benefit from this information.

When identifying positions of cars driving in specific lanes, the resolution of the GPS system may be too low. However, it is within the scope of the present invention to incorporate hybrid location techniques as known in prior art. For example it is known how to combine GPS positioning with for example cell phone tower triangulation techniques. There is also an interesting technique disclosed in U.S. Pat. No. 8,362,949 by Qingxuan Yang et al with the title "GPS and MEMS hybrid location-detection architecture". The teaching discloses how for example an accelerometer; gyro etc. in a mobile terminal like a mobile phone can be combined with GPS information to provide improved geographical position accuracy of moving objects.

When a road user reports incidents, like for example as described with reference to FIGS. 3a, 3b, 3c, and 3d, the current server receives the message from the Mobile terminal, for example as a standardized text message.

As indicated above, examples of data sets as illustrated in FIGS. 5 and 6 may comprise an information element "messages". This can be a stack of messages enabling a push and pop operation of messages. The communication link between software modules that is providing an encapsulation for example of a message stack of a specific data set for a specific user and a specific GSM terminal registered to a road user can be achieved via message oriented middleware (MOM) which is software and/or hardware infrastructures supporting sending and receiving messages between distributed systems, as known in prior art.

Another choice is a more "hardwired" solution based on standard Transmission Control Protocol (TCP) sockets. Application services being programs running for example on servers can create sockets on start-up of the application program, and which may be in a listening state. These sockets are waiting for initiatives from client programs. A TCP server may serve several clients concurrently, by creating a child process for each client and establishing a TCP connection between the child process and the client. Unique dedicated sockets are created for each connection. These are in established state, when a socket-to-socket virtual connection or virtual circuit (VC), also known as a TCP session, is established with the remote socket, providing a duplex byte stream.

A server may create several concurrently established TCP sockets with the same local port number and local IP address, each mapped to its own server-child process, serving its own client process. They are treated as different sockets by the operating system.

A software module encapsulating a specific message stack can then listen to a specific GSM terminal over a specific dedicated socket, and when a message is received over the socket the message may be pushed onto the stack. The encapsulating software that is activated by the message that is received via the socket identifies also which data set the specific message stack is linked to (since it is linked to the specific data set the specific stack is part of), and can for example wake up a software module in the server providing message distribution of the message in a union. The distribution can be achieved by the message distribution process by following pointers "upwards" and "downwards" in the specific data set linked to the specific message stack that points to other road users of a union the data set is a road user of. The process stops when the message distribution process encounters a "NULL" pointer in both ends of the linked list the specific road user is part of. The messages can be pushed on the stack with time and date stamps. Then the actual transfer out to from the stacks to specific GSM terminals for example, can be achieved in an asynchronous manner, which simplifies the distribution of messages. In this manner a message to road users in a union can be qualified as being relevant just by following sorted linked lists with respect to GSM positions, and these road users can be reached just by following links upwards and downwards until a "NULL" pointer is encountered in the list.

In this manner the last message received is on the top of the stack while other messages can be kept to provide traffic data for example distributed to prior art traffic analysis programs that can be part of a server according to the present invention.

Figure 7:
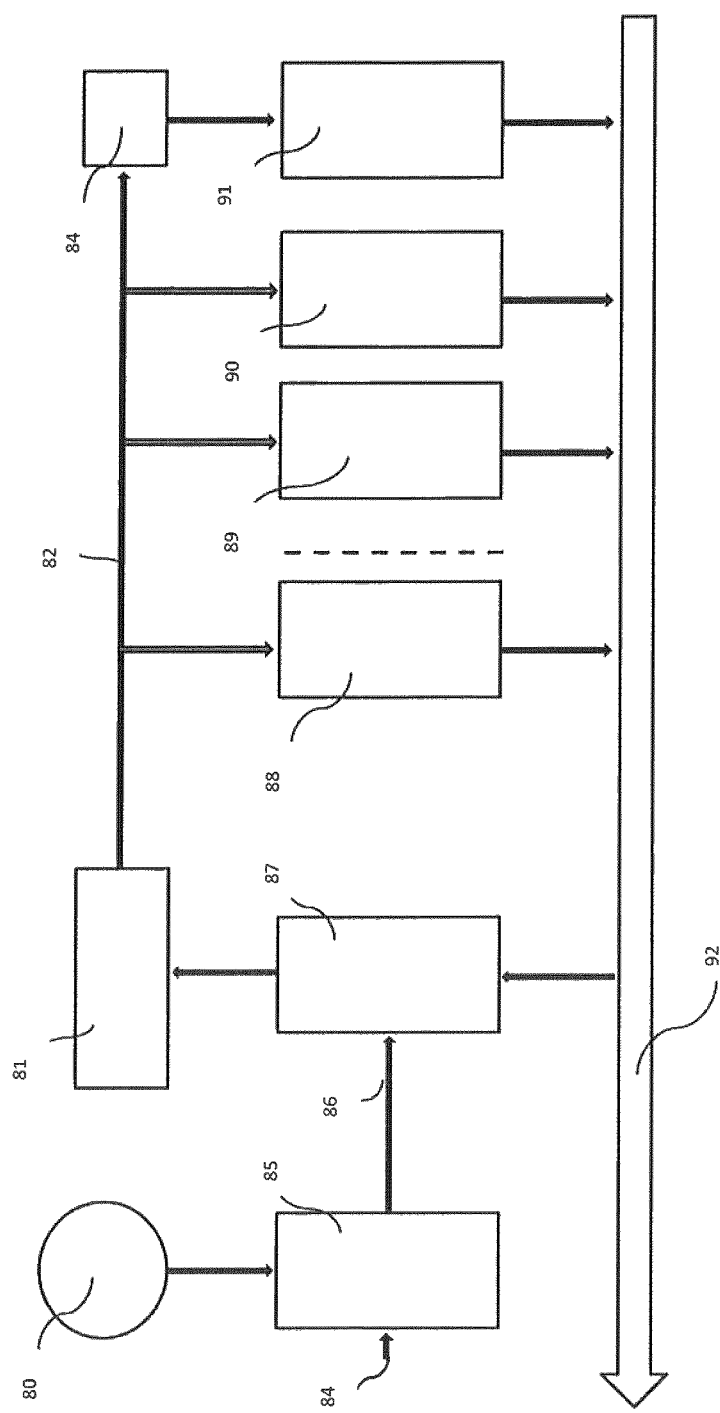
FIG. 7 illustrates an example of a structure enabling control of unions according to the present invention.

FIG. 7 illustrates an example of a "run time" system that can handle data structures and operations of data sets as discussed above.

In FIG. 7 a database 80 comprises respective user definitions and corresponding information in sets A, B, C etc., for example data sets as disclosed above. The database 80 that stores data sets comprising user profiles and other information elements can be located geographically close to a residential address of a user, and which was selected when a user registered as a user the first time. When a road user starts his car to drive away he can do this far away from this server, and even in another country, and when the road user wants to activate his membership and get access to services of the membership, he can log into a WEB page on the server he was using when registering as a user via for example a GPS navigation system, or a mobile phone, or any Mobile terminal or terminal of any kind the road user carries with him. When the server accepts the in-logging session the server reads out relevant information from the Mobile terminal that the road user is using, for example the actual GPS position from the Mobile terminal the road user is carrying with him (ref. "Current GPS" in FIG. 5) and the server can identify which server according to the present invention that serves the geographical area the road user now is presently located in based on the GPS position.

The associated data sets of users are transferred to an active user list 85 as depicted in FIG. 7, and the server updates GPS positions by reading out GPS coordinates 84 from users residing in the active user list 84 and update the related data sets. Then the updated GPS positions and field of view definitions are transferred over a communication link 86 to a process queue 87. However, it is within the scope of the present invention that users may be moving road users as well as stationary objects like a traffic light, a petrol station etc., and then there is no need for updating GPS positions. This can for example be achieved with a flag associated with the data elements for the GPS positions in the data sets indicating if the associated user of the data set is a stationary user or a mobile user.

A GPS processor 81 may randomly pick for example pairs of GPS coordinates from the process queue 87, and identify overlapping field of views between users. Alternatively, if the server does have a modelled topological map of the geographical area served by the traffic server, the GPS processor 81 may pick users within selected sub areas with a higher probability of finding users that can form unions. After users have been picked a pair of users is pushed off from the process queue 87. Dependent on the magnitude of distances between the pair of GPS coordinates that are picked, and the definitions of the respective field of views, the respective GPS coordinates together with the associated sets of data are then sorted into different priority queues 88, 89, 90. For example, if distances between perimeters of respective modelled field of views are identified to be greater than 1000 meters and there is no union, they are put into the priority queue 88. If the distance instead is less than 1000 meters, and there is no union, but the distance is greater than 500 meters the associated sets of data are put in the priority queue 89, while priority queue 90 can be for pair of data sets where the distance is less than 500 meters, but that are not forming unions. If the GPS processor 81 decides that there is at least a partly overlapping of field of views that satisfy conditions for a union, the associated data sets of the possible union are sent via a union rule decision process 83 that can decide if a creation of the union is allowed (rules associated with type of union, number of road users in a union etc.). When the unions are allowed and formed they are transferred to a priority queue 91.

Data sets from all priority queues 88, 89, 90, 91 are transferred back to the process queue 87 that will comprise single sets A, B, C etc. and/or unions U1, U2, U3 etc. mixed with newly activated users from the active user list 85. When a data set enters the active user list 85 the server reads out GPS coordinates and updates the data sets in the active user list 85.

The respective priority queues 88, 89, 90, 91 are all circulated. Output from the priority queues are transferred back to the process queue 87 via a communication link 92. Since it is probable that users with a distance between perimeters of field of views that is greater than for example 1000 meters, it probably is a need of some times in the traffic to be able to form a union, the circulation of the priority queue 88 is slower than the other priority queues 89, 90 that are circulated quicker. In this manner there will be a random shifting of users being in the process queue 87. Unions are also circulated and an output from the union list 91 via the communication link 92. Since it is probable that a union will be active for a while, the unions are circulated slower. The speed of circulating the respective queues can be tuned in respective examples of embodiments. Besides providing priority between data sets, this example of embodiment also provides a load distribution of the server system itself.

It is further within the scope of the present invention to provide an optional sorting of users in the active user list 85 before they can be picked and placed in the process queue 87. In another example of embodiment, the users in the process queue 87 are picked according to geographical closeness between the pair of users that are being processed at any time.

The communication link 92 may also comprise a process of identifying and controlling if a GPS position is within the geographical area supported by the current server. If the GPS position is outside the geographical area the process in the communication link 92 signals the server about the situation, and the server is configured to transfer the data set associated with this GPS position to a next server being located adjacent to the geographical area of the current server. This is indicated with an arrow on the communication link 92.

The server may also be configured to parse the linked lists the data set to be transferred is part of. Then all road users of a union being outside the geographical area of the current server are transferred to the next server. Those road users that still may be able to be served by the current server forms a new union and will be transferred to the next server when their respective GPS positions indicating this. Then they can be road users again of the union they were road users of.

The link 92 can be a message bus for example implemented inside publisher subscriber architectures as known to a person skilled in the art. This enables a simple expansion of the system, also over networks to other servers. If there are assigned different servers to different geographical regions, the transfer of data sets from "current server" to a next server is simplified with such a message system within a framework of publisher subscriber solutions as known to a person skilled in the art. The server address, with respect to which server that is now current server, is updated in the data sets that are transferred to the next server.

According to another example of embodiment, all processing modules and/or functional units as well as sets are integrated into the system as units communicating over a network with an Internet protocol, for example using standard protocols for WEB services. In this manner scalability is maintained over separate server systems and within servers, and the implementation requires only communication between unique identified and definable addresses in the structure, as known to a person skilled in the art.

One of the tasks a current server is performing is calculating overlap between geometrical shapes of field of views defined and selected by users registering in the system. The shape of a field of view can be changed at any time. When trying to establish a partly overlap between different shapes and sizes of field definitions, ordinary geometrical rules and calculus may be used. However, when investigating partly overlap of field of views among road users many simplifications may be done to ease the calculations. For example, an exact identification of an overlap is not necessary. If there are 5 meters left before an actual partly overlap happens it is of no significance if this situation is identified by the current server as being a real overlap. The same is true when identifying if a road user is no longer a road user, i.e. has no overlap with his field of view. If the spilt actually has happened, and the distance of the split is in the meter range it is of no significance if the road user is still detected as being road user of the union. The important aspect is that the forming of unions and splitting of unions is provided for with a reasonable enough accuracy. This implies that complex shapes of field of views can be approximated to for example fields of view with simpler shapes that again provide simpler and quicker calculations. The inaccuracy this can provide is within the tolerance for detecting the process of forming and splitting of unions.

Another aspect of the present invention is the ability to integrate an example of embodiment of the present invention into a social network. Social networks are characterized in providing social contact between people that has accepted each other as friends on the social network site. Such friends are usually family road users and real friends from the ordinary social life. In addition it is possible to learn about other people and become friends with them.

The user registration of social networks can be adaptable to the user registrations required for an example of embodiment of the present invention. The more specialized aspects like defining a field of view etc. can be postponed to the first time a social network user access a service of the example of embodiment of the present invention. For example, on the social network site in the user profile registered there, it is possible to provide a link to the example of embodiment of the present invention which uses the user credentials of the social network and then prompts the user in an interactive session to provide registration of additional information.

The benefit of such a solution is that despite forming unions and splitting unions is by default an anonymous operation according to the present invention, the link to the social network can be used to parse a user's list of friends that is also using the example of embodiment of the present invention, and those friends that are online and is in a union with the user can be identified with real names in the union. This enables a session over the social network between the friends which can enhance the validity and relevance of traffic information in addition of the possibility to make an appointment of stopping and sharing a coffee at nearest road side restaurant, for example.

In an example of embodiment of the present invention, each message that is received may be tagged with a time-stamp for reception of the message in the server together with geographical coordinates of the mobile terminal the message came from. Inside the messages related to a specific union it is then possible to look at the time tag to identify if a same standard message has been submitted with only a minute in between for example. This indicates that a same traffic condition has been reported independently by road users in this specific union. Therefore, the traffic server system 20 may therefore remove all duplicate messages within a definable timespan that probably indicates that these messages stem from the same traffic incident. The result is that only one message will be distributed to road users in the union.

If there are conflicting messages some sort of arbitration between conflicting messages may be necessary, like for example decide if it is true that there is a queue ahead on a road or not. For example, if the speed of the road users in a union is normal (i.e. within the allowed speed limit) it is probably a wrong message if the message is about a large queue problem, and such a message may be discarded.

It is also possible to provide arbitration by counting the number of messages that has the same contextual meaning, and let the message with the highest count be the correct message.

It is also possible to look at the geographical position of a mobile terminal being in the front of a union. For example, it is more likely that a road user with this registered mobile terminal has the best view of a traffic incident in front of the union in the direction of travel. Therefore, the geographical positions of the mobile terminals may be used in an arbitration process.

It is further within the scope of the present invention to provide a weighting of the different parameters being used in the arbitration process between messages. For example, number of equal messages should count more than position within the union for example. If two road users in the union are in a geographical close distance to each other, and are reporting conflicting messages, it may then be the number of equal messages from other road users in the union that is used in the arbitration process between the conflicting messages. The weighting factors can be used to modify importance of a parameter with respect to the kind of traffic incident the message comprises. If the distance is larger, the distance parameter may be more relevant.

If the message being reported by a road user of a union is about an accident the GPS position of the observer, i.e. the road user reporting the accident can be used as the geographical position of the event. In case the road user reporting the accident has defined a rather large field of view in his profile the server listening to messages may contact the specific road user through the default union between the server and the road user and ask the road user to qualify the position of the accident by for example typing a message like "left 200 meters". Then the server can locate the accident position much more precisely.

The concept of a union provides an endless possibility of establishing a connection between participants that has something interesting to share with respect to observing incidents inside their own field of view to others being in a union with them. For example, a TV broadcaster may be a registered road user that via the definition of the field of views and/or qualifiers in the user profiles can come in a union with a road, or a metro line etc. as discussed above. This union can be established (enabled by the TV broadcaster, for example changing from a passive mode to an active mode) when there is an accident for example. When the TV station issues an "Update my field of view" road users in the union may then start to submit for example video from the accident.

The versatility of the concept of unions makes it also necessary for road users to filter the kind of actions they want to participate in a union with others. Such reservations against certain activities may be provided for in the user profile for the road user. In addition the response to an "Update my field of view" request may also be to cancel further requests.

A further application of the concept of unions may be in security applications like an assault alarm system. A field may be qualified as a "security field". When people moves around in the traffic or at any place and are for example being harassed by a person, it is possible for the person to activate a symbol like "Danger" that feeds this message with position information to other people being nearby in a security union with the person, The people in the security union can then quickly come to the rescue of the person. If there are no persons in the union, the server of the system like the traffic server 20 will by default be in a union with the person and can automatically alert the police and send the coordinates of the location the person sent the "Danger" message from. In this example there is no difference in the technical infrastructure compared with a system directed towards "Traffic surveillance and Guidance" systems. Therefore it is a straight forward process of adapting the present concept of unions and examples of embodiments of this concept into other areas of interest. It is within the scope of the present invention to provide a system based on the concept of unions in any relevant field of technical applications utilizing the concept of unions.

Within the concept of security fields it is also possible to create a "fence field". This field can be active around a parked car wherein a GPS transmitter in the car sends the geographical positions regularly. If the geographical position changes it is possible due to an unauthorized movement of the cat, for example the car may be stolen. This change of position can then be used to alert the owner of the car.

Additional security features of the system can also be added with respect to which persons are running to help a person in need. The purpose of the union is to reach people with a direct message about the assault located in the vicinity of the assault, and therefore has a chance of reaching the location of the assault quickly. When an assault alarm has been issued the server may be further configured to identify positions of persons around the position of the issued alarm without demanding that there is formed a union. The server may be configured to identify the person issuing the alarm via the credentials registered in the user profile of the system. This can also be done with respect to all the other persons that are in the union, or is alternatively located in some relevant distance outside the union. This information may be submitted directly to the police, and the police can easily identify witnesses to the assault, or witnesses that have observed interesting events in surrounding areas of the assault.

However, there is a risk that some people that are road user of such an assault alarm system are road users for the purpose of legally hunt and beat up people doing assaults. Their motives are then not to help a victim of an assault. Instead they might like to fight and such situations can provide a scene where they can practice this legally. Such persons will probably in the end be known to the police. Therefore, when the server identifies the real identity of persons around the location of the assault with a bad track record, the server may be configures to issue a direct warning to a mobile phone carried by the person in question. In this manner the person in question will lose the "legality" of any wrong doing when the person arrives at the scene of the assault, and the chances that the person will arrive at the scene to help the victim will be much more probable.

According to an example of an assault alarm system according to the present system, a road user of the system can register family road users that will always be in a union, i.e. receive alarm messages, regardless of how far away family road users are located at any time.

The invention claimed is:

1. A traffic surveillance and guidance system comprising a traffic server system configured to provide acquisition of traffic information from a plurality of information providers, and a plurality of registered road users of the traffic server system, wherein
   a server of the traffic server system is configured to provide the traffic information, guidance advice and traffic advice to the plurality of registered users of the traffic server system,
   the traffic server system is configured to receive, update and record data of geographical positions transmitted from mobile terminals associated with the plurality of registered road users of the traffic server system, and
   a user profile of each registered road user of the plurality of registered road users comprises a user-defined geometrically shaped model of a field of view representing each registered road users' observation space and observation ability of traffic conditions and incidents around geographical positions that each registered road user is located on at any time, wherein
   the traffic server system is configured to follow movements of the plurality of registered road users based on the received and recorded data of the geographical positions, and to detect when relative movements of the plurality of registered road users provide a situation of at least two modelled fields of view of at least a first road user and at least a second road user partly overlapping,
   the traffic server system is configured to form a union between the at least a first road user and the at least a second road user having partly overlapping fields of view, wherein the server is configured to create a communication channel or a message distribution process between the at least a first road user and the at least a second road user constituting the union,
   whenever relative movements of at least a third road user provide a situation wherein a modelled field of view of the at least a third road user partly overlaps the modelled field of view of the at least a first road user, or the at least a second road user, the at least a third road user becomes part of the union,
   the traffic server system is configured to connect the at least a third road user to the created communication channel or the created message distribution process in the union,
   the traffic server system is further configured to monitor unions that are constituted between other road users of the plurality of registered road users,
   and whenever relative movements of a specific road user of the other road users in a union of the monitored unions provides a situation wherein the specific road user no longer has a partly overlapping field of view with at least one of the other road users in the union of the monitored unions,
   the traffic server system is configured to disconnect the specific road user from a communication channel or a message distribution process in the union of the monitored unions, and the specific road user is no longer part of the union of the monitored unions.

2. The traffic surveillance and guidance system according to claim 1, wherein the traffic server system is configured to record messages distributed in a union between road users,
  the traffic server system is further configured to provide an arbitration process between conflicting content of the messages within the union between the road users, and
  the arbitration process is configured to select one of the messages including conflicting content to be a message to be distributed in the union between the road users, or cancels the distribution of a specific message of the messages in the union between the road users, or selects another message of the messages for distribution in the union between the road users.

3. The traffic surveillance and guidance system according to claim 1, wherein the traffic server system is configured to be a traffic server among a plurality of traffic servers,
  wherein each respective traffic server of the plurality of traffic servers is configured to support road users in a specific defined geographical area,
  wherein the plurality of traffic servers further is configured to exchange data related to a road user when a specific geographical area served by another traffic server is entered by the road user,
  wherein each respective traffic server serving respective geographical areas is configured to be a road user itself, and
  wherein modelled fields of view of the respective traffic servers are the respective geographical areas served by the respective traffic servers, or the geographical area served by the respective traffic servers is segmented into a plurality of fields of view.

4. The traffic surveillance and guidance system according to claim 1, wherein the traffic server system is configured to monitor unions by dissolving unions on a regular basis, and
  form a union again of a dissolved specific union omitting any road users originally being in the dissolved union, but that no longer fulfills the criterion of having partly overlapping fields of view.

5. The traffic surveillance and guidance system according to claim 1, wherein a road user includes at least one of a person driving a car, cars, persons riding motorbikes, motorbikes, pedestrians, commuters, a metro line, a railway line, trains, an aero plane route, an aero plane, people travelling on bicycles, bicycles, road traffic reporters in helicopters, helicopters, a ferry, a toll road station, a cafeteria, a bus terminal, a bus, an atelier, a taxi, a traffic light, and also other traffic server systems, and other persons and objects.

6. The traffic surveillance and guidance system according to claim 1, wherein the geographical positions of the plurality of registered road users are identified by data submitted from Global Positioning System (GPS) transmitters being part of the mobile terminals accompanying the plurality of registered road users of the traffic surveillance and guidance system.

7. The traffic surveillance and guidance system according to claim 1, wherein the geographical positions of the plurality of registered road users are identified by data submitted from hybrid positioning systems.

8. The traffic surveillance and guidance system according to claim 1, wherein a name of a geographical position that a registered road user is located on is identified by data submitted from a relational database being adapted to geographical queries.

9. The traffic surveillance and guidance system according to claim 1, wherein a registration of a road user to become a registered road user of the traffic server system comprises providing authentication of the road user's identity, and optionally a downloading of a mobile application program from the server to respective mobile terminals that the road user is registering with the server in addition to other information elements.

10. The traffic surveillance and guidance system according to claim 1, wherein a registration of a road user comprises adding a default shape of a field of view if the road user fails or omits to register a user-defined geometrically shaped model of a field of view representing the road user's observation space and observation ability.

11. The traffic surveillance and guidance system according to claim 1, wherein a registration of a road user comprises assignment of optional parameter values modifying the road user's perception of traffic information received by the road user when being in a union.

12. The traffic surveillance and guidance system according to claim 1, wherein a registration of a road user comprises assignment of parameter values for direction of travel, speed of travel or features being assigned as optional parameter values.

13. The traffic surveillance and guidance system according to claim 1, wherein a registration of a road user comprises assigning a user as an active user or a passive user of the traffic surveillance and guidance system.

14. The traffic surveillance and guidance system according to claim 1, wherein registered information related to a road user is defined as a set of data being organized as an indexed collection of information elements, wherein a pointer structure in the data set is updated by the server providing information about which other data sets of other road users that are in a union with each other.

15. The traffic surveillance and guidance system according to claim 1, wherein a union comprises updated data of geographical positions of road users associated with the union, and wherein the road users in the union optionally can be sorted in respective sequences with respect to the geographical positions of respective road users in the union.

16. The traffic surveillance and guidance system according to claim 1, wherein a union comprises updated data of geographical positions of road users associated with the union, and wherein the road users in the union optionally can be sorted in respective sequences with respect to the geographical positions of respective road users in the union,
  wherein the sorting takes into account direction of travel of respective road users in the union.

17. The traffic surveillance and guidance system according to claim 1, wherein a union comprises updated data of geographical positions of road users associated with the union, and wherein the road users in the union optionally can be sorted in respective sequences with respect to the geographical positions of the respective road users in the union,
  wherein messages sent from one road user to other road users in the union are qualified with respect to which one of the sorted sequences with respect to geographical positions of the road users that the road user is located on.

18. The traffic surveillance and guidance system according to claim 1, wherein a union comprises updated data of geographical positions of road users associated with the union, and wherein the road users in the union optionally can be sorted in respective sequences with respect to the geographical positions of respective road users in the union,
  wherein the sorting takes into account direction of travel of the respective road users in the union, and
  wherein messages sent from one road user to other road users in the union are qualified with respect to which one of the sorted sequences with respect to geographical positions of the road users that the road user is located on.

19. The traffic surveillance and guidance system according to claim 1, wherein registration of road users can be made with reference to data from a user register of a computer-implemented social network,
wherein the traffic server system is configured to parse a friends list in the social network of a first road user, and whenever the server identifies a friend on the list being a second road user in a union with the first road user, the server notifies both road users about their presence in the same union.

20. The traffic surveillance and guidance system according to claim 1 wherein the traffic server system is configured to identify messages related to incidents or events affecting road conditions, wherein the traffic server system creates a field of interest around a geographical position of a reported incident or event, wherein any road user being in a union with the field of interest, or that comes into a union with the field of interest, receives push messages and advice regarding the reported incident or the reported event.

21. The traffic surveillance and guidance system according to claim 1, wherein the traffic server system is adapted to be part of an assault alarm system, and wherein any registered user of the assault alarm system can optionally be a registered road user,
wherein the assault alarm system is configured to identify registered names of persons being inside a union, and also a person in surrounding areas of the union, and then submit the names to a law and order enforcement authority when an alarm is issued by the assault alarm system,
wherein registered road users and their registered family members are by default inside a common union regardless of a distance between the family members of the registered road users.

22. The traffic surveillance and guidance system according to claim 1, wherein a registered road user optionally can register further field definitions of modelled fields that are qualified with specific qualifiers linked to respective actions, services and/or functions, and whenever a union of qualified fields is detected by the traffic server system, the traffic server system is configured to provide necessary computer and networking infrastructure and execute computer programs facilitating the respective actions, services and/or functions assigned to respective specific qualified unions.

* * * * *